US012467490B2

(12) United States Patent
Schröder et al.

(10) Patent No.: US 12,467,490 B2
(45) Date of Patent: Nov. 11, 2025

(54) MAGNETIC-MECHANICAL CLOSURE DEVICE

(71) Applicant: Fidlock GmbH, Hannover (DE)

(72) Inventors: Michael Schröder, Bad Wildungen (DE); Breido Botkus, Hannover (DE)

(73) Assignee: Fidlock GmbH, Hannover (DE)

(*) Notice: Subject to any disclaimer, the term of this patent is extended or adjusted under 35 U.S.C. 154(b) by 15 days.

(21) Appl. No.: 18/271,974

(22) PCT Filed: Oct. 26, 2021

(86) PCT No.: PCT/EP2021/079600
§ 371 (c)(1),
(2) Date: Jul. 12, 2023

(87) PCT Pub. No.: WO2022/152418
PCT Pub. Date: Jul. 21, 2022

(65) Prior Publication Data
US 2024/0084831 A1  Mar. 14, 2024

(30) Foreign Application Priority Data
Jan. 13, 2021 (DE) .......................... 102021200260.9

(51) Int. Cl.
F16B 2/10   (2006.01)
A41F 1/00   (2006.01)
A44B 13/02  (2006.01)

(52) U.S. Cl.
CPC ............... *F16B 2/10* (2013.01); *A41F 1/002* (2013.01); *A44B 13/02* (2013.01); *F16B 2200/83* (2023.08)

(58) Field of Classification Search
CPC .................. F16B 2/10; F16B 2200/83; F16B 2001/0035; F16B 21/186; A41F 1/002;
(Continued)

(56) References Cited

U.S. PATENT DOCUMENTS 8,555,470 B2   10/2013  Spataro et al.
9,585,445 B2 * 3/2017  Qian .................. A41F 1/002
(Continued)

FOREIGN PATENT DOCUMENTS

AU   2007272165 A1   1/2008
CN   101646366 A     2/2010
(Continued)

*Primary Examiner* — Jason W San
*Assistant Examiner* — Rowland Do
(74) *Attorney, Agent, or Firm* — The Webb Law Firm

(57) ABSTRACT

A closure device includes a first closure part, which includes a base element and at least one closure element movably arranged on the base element with a form-fitting portion arranged thereon, and a second closure part, which includes an engagement element with an engagement portion formed thereon. In an open position of the closure device the first closure part and the second closure part are separated from each other and can be attached to each other along a closing direction for closing the closure device. The form-fitting portion of the at least one closure element can be brought into engagement with the engagement portion of the engagement element in an engagement direction substantially transversely to the closing direction. On the at least one closure element of the first closure part a first magnetic element is arranged and on the engagement element of the second closure part a second magnetic element is arranged.

18 Claims, 40 Drawing Sheets

(58) Field of Classification Search
CPC ... A44B 13/02; A44D 2203/00; H01F 7/0263; Y10T 24/32; Y10T 292/11; A45D 2040/223; E05C 19/163; E05C 19/168
See application file for complete search history.

(56) References Cited

U.S. PATENT DOCUMENTS

| | | |
|---|---|---|
| 9,949,532 B2 | 4/2018 | Xanthos et al. |
| 10,617,179 B2 | 4/2020 | Fiedler et al. |
| 10,874,178 B2 | 12/2020 | Cheng |
| 2007/0180856 A1* | 8/2007 | Hashimoto ......... A44C 5/2042 63/3.1 |
| 2010/0283269 A1 | 11/2010 | Fiedler |
| 2010/0308605 A1 | 12/2010 | Fiedler |
| 2011/0298227 A1 | 12/2011 | Fiedler |
| 2012/0056065 A1 | 3/2012 | Andersson |
| 2012/0216373 A1 | 8/2012 | Fiedler |
| 2012/0291227 A1 | 11/2012 | Fiedler |
| 2016/0037879 A1 | 2/2016 | Qian et al. |
| 2016/0053926 A1 | 2/2016 | Whitaker |
| 2017/0127764 A1 | 5/2017 | Fiedler |
| 2018/0187713 A1 | 7/2018 | Chmelar |
| 2019/0116939 A1* | 4/2019 | Porto .................. A44B 11/266 |
| 2019/0343239 A1 | 11/2019 | Fiedler |
| 2020/0237116 A1* | 7/2020 | Yabuuchi ............ B62B 7/006 |
| 2020/0268108 A1 | 8/2020 | Fiedler |
| 2020/0385096 A1 | 12/2020 | Hall |

FOREIGN PATENT DOCUMENTS

| | | |
|---|---|---|
| CN | 101925313 A | 12/2010 |
| CN | 102292006 A | 12/2011 |
| CN | 102422337 A | 4/2012 |
| CN | 102612326 A | 7/2012 |
| CN | 102741565 A | 10/2012 |
| CN | 105387298 A | 3/2016 |
| CN | 108495569 A | 9/2018 |
| CN | 109382668 A | 2/2019 |
| CN | 110352021 A | 10/2019 |
| CN | 209660591 U | 11/2019 |
| CN | 210265383 U | 4/2020 |
| CN | 212101630 U | 12/2020 |
| CN | 114763804 A | 7/2022 |
| CN | 217681118 U | 10/2022 |
| CN | 116761527 A | 9/2023 |
| DE | 102008006135 A1 | 7/2009 |
| DE | 102018201021 A1 | 5/2019 |
| EP | 2531736 B1 | 3/2014 |
| EP | 2527870 B1 | 11/2014 |
| EP | 2959174 B1 | 6/2018 |
| EP | 3494826 A1 | 6/2019 |
| EP | 3616552 A1 | 3/2020 |
| IN | 202027021720 A | 10/2020 |
| JP | 2020117205 A | 8/2020 |
| WO | 2008006357 A2 | 1/2008 |

* cited by examiner

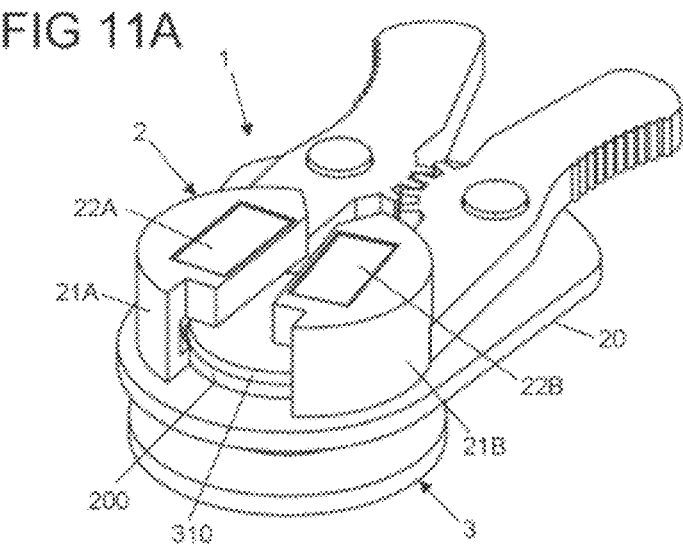
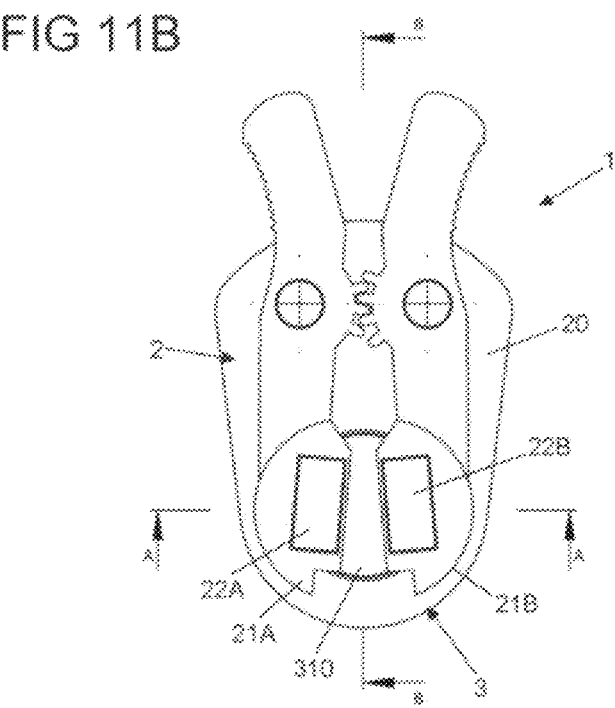

FIG 13
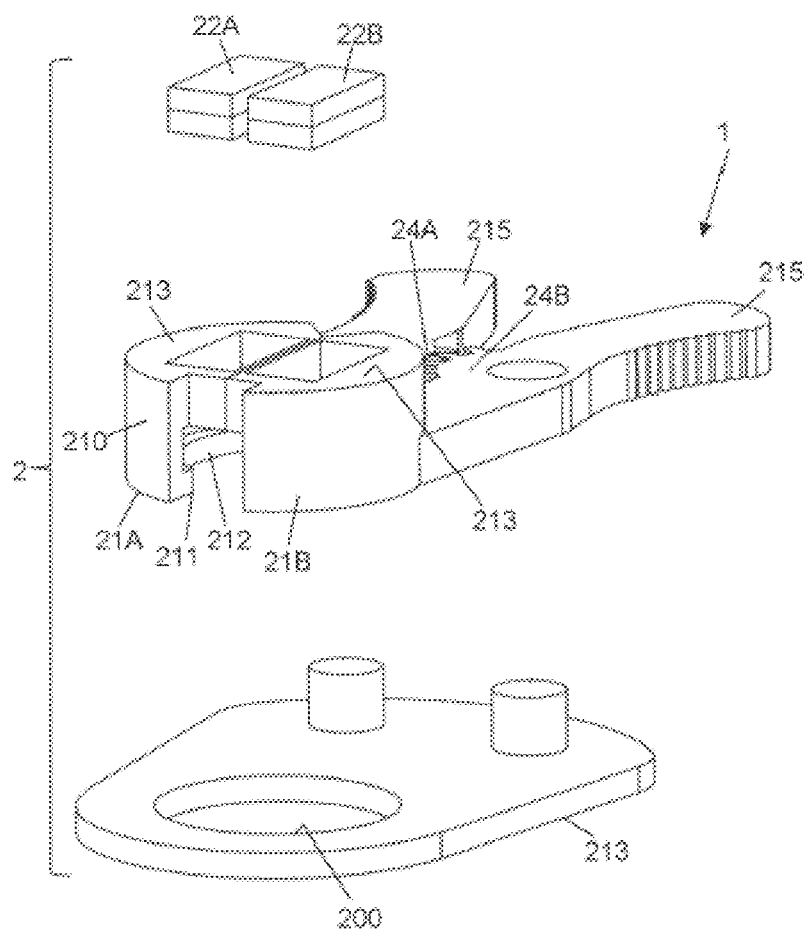
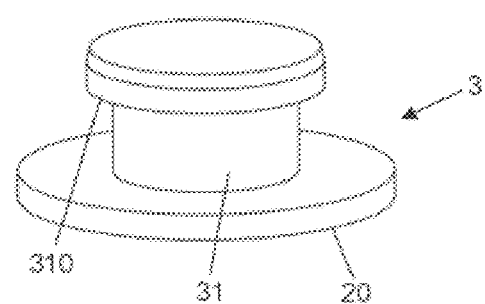

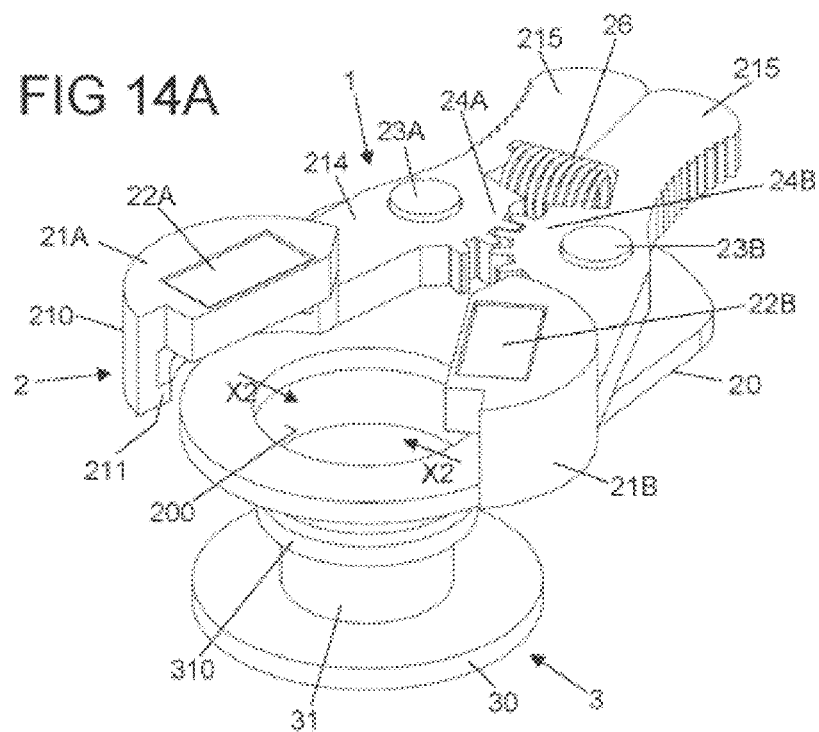

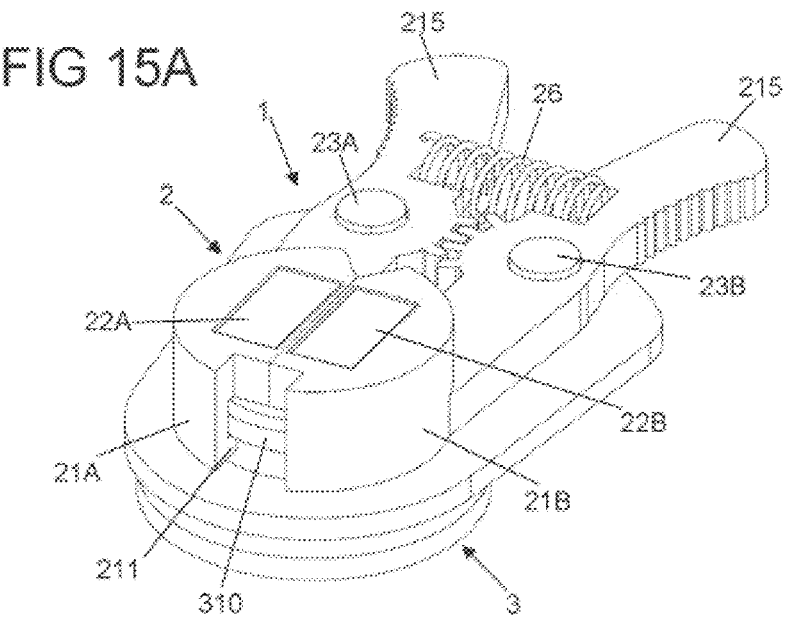
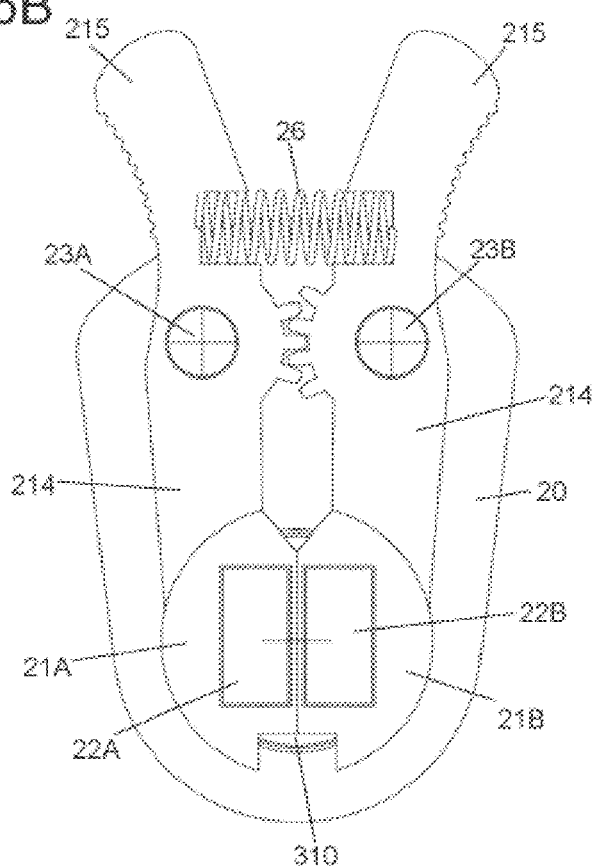

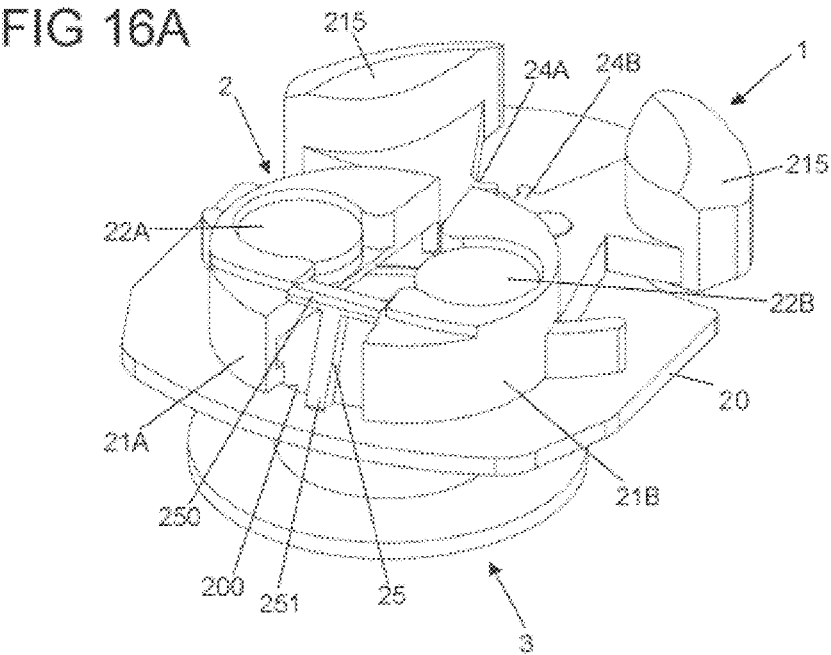
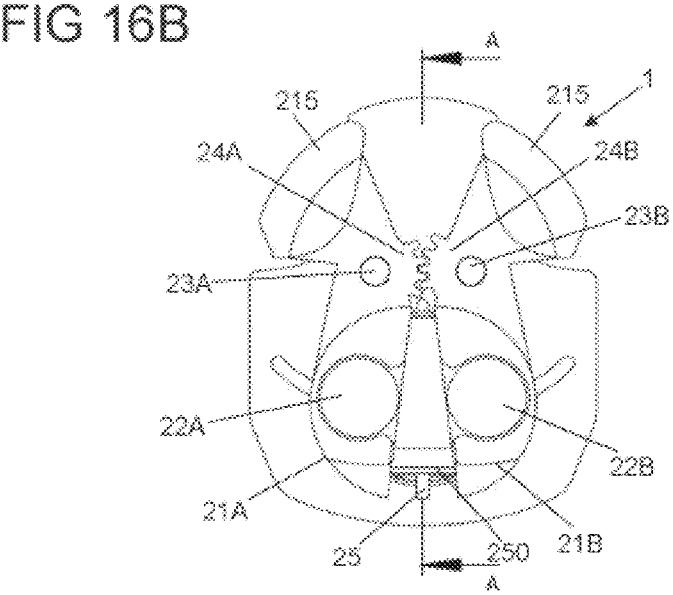

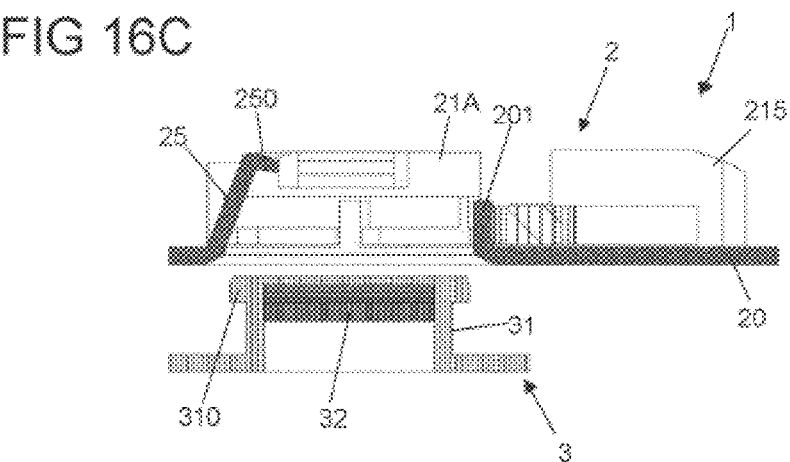
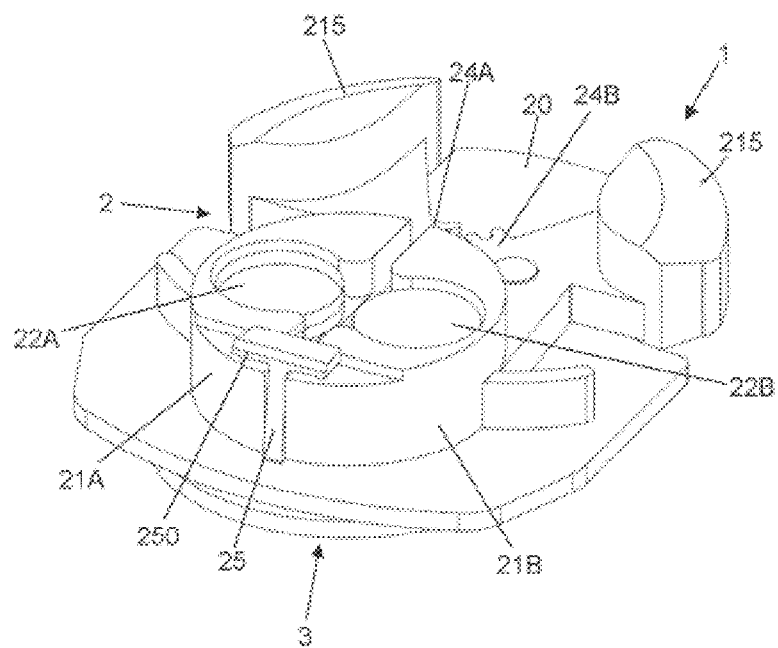

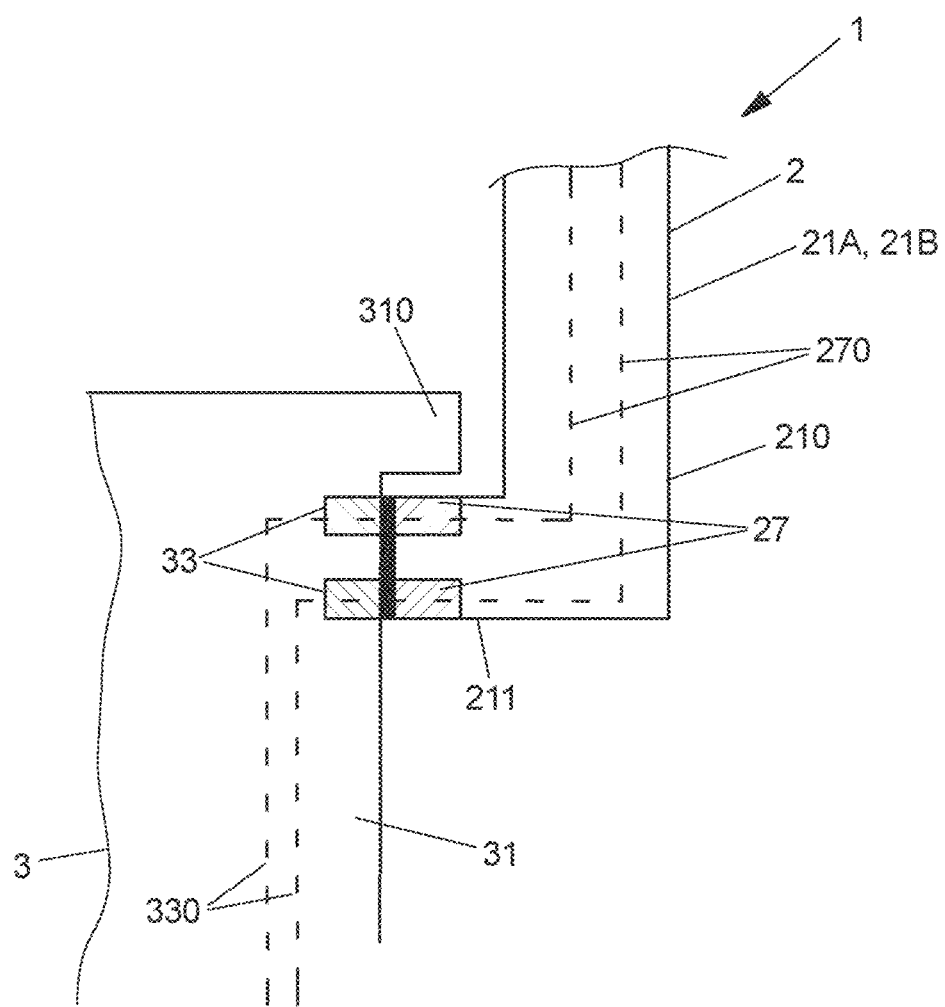

MAGNETIC-MECHANICAL CLOSURE DEVICE

CROSS-REFERENCE TO RELATED APPLICATIONS

This application is the United States national phase of International Patent Application No. PCT/EP2021/079600 filed Oct. 26, 2021, and claims priority to German Patent Application No. 10 2021 200 260.9 filed Jan. 13, 2021, the disclosures of which are hereby incorporated by reference in their entireties.

BACKGROUND OF THE INVENTION

Field of the Invention

This disclosure relates to a closure device.

Description of Related Art

Such a closure device is used to connect two assemblies to each other, for example as a closure for bags, items of clothing, shoes or helmets, to produce a plug connection for example for electric or electronic applications or as a coupling for example for belts or ropes, but also to connect components and accessory parts on superordinate assemblies to each other, for example in or on vehicles (for example in motor vehicles, airplanes or also ships or boats), on suitcases or bags or the like.

Such a closure device has a first closure part which includes a base element and at least one closure element movable relative to the base element with a form-fitting portion arranged thereon. A second closure part on the other hand has an engagement element with an engagement portion formed thereon. In an open position of the closure device, the first closure part and the second closure part are separated from each other and can be attached to each other along a closing direction for closing the closure device. The form-fitting portion of the at least one closure element here can be brought into engagement with the engagement portion of the engagement element in an engagement direction substantially transversely to the closing direction, so that in a closed position the first closure part and the second closure part are held at each other along the closing direction.

Due to the operative connection of the closure element of the first closure part with the engagement element of the second closure part, the closure parts are fixed to each other in the closed position of the closure device so that assemblies associated to the closure parts are connected to each other via the closure parts. By actuating the at least one closure element, the closure parts can be detached from each other so that the assemblies can be separated from each other.

In such a closure device, in principle, there is a need for a firm hold in the closed position, but with easy handleability for closing the closure device and also for opening the closure device.

In a connecting structure known from WO 2008/006357 A2, a spring locking element is arranged on a closure module and a (rigid) locking piece is arranged on another closure module. In a closed position, the spring locking element and the locking piece are in engagement with each other so that the closure modules are held at each other. By moving the closure modules relative to each other, the connecting structure can be opened so that the closure modules can be separated from each other. The attachment is magnetically supported via magnetic means, in that the closure modules are magnetically drawn towards each other and the engagement between the closure modules thus is produced at least largely automatically.

From U.S. Pat. No. 8,555,470 a closure device in the form of a carbine is known, in which a closing piece of the carbine is magnetically coupled in a closed position.

In a closure device known from EP 2 959 174 B1, two closure elements are pivotally arranged on a base element. The closure elements are mechanically pretensioned in the direction of a closed position via a spring. On attachment of a closure part, the closure elements are pressed apart by the closure part running up onto run-up slopes of the closure elements, wherein the attachment of the closure part is magnetically supported.

SUMMARY OF THE INVENTION

It is the object underlying the proposed solution to provide a closure device that provides for a firm connection with easy operability both for closing and for opening the closure device.

This object is achieved by a closure device with features as described herein.

Accordingly, the closure device includes a first magnetic element arranged on the at least one closure element of the first closure part and a second magnetic element arranged on the engagement element of the second closure part. In the open position, the at least one closure element of the first closure part takes a first position relative to the base element. On closing of the closure device, the first magnetic element and the second magnetic element cooperate in a magnetically attracting way so that the at least one closure element with the form-fitting portion is moved relative to the base element out of the first position in the engagement direction, in order to bring the form-fitting portion into an operative connection with the engagement portion of the engagement element.

In one embodiment, a force is applied onto the at least one closure element of the first closure part in the open position such that the at least one closure element takes the first position relative to the base element. Thus, the at least one closure element is loaded in the direction of the first position due to a force and is thereby held in the first position when the closure device is open.

When the closure device is open, the at least one closure element of the first closure part is in a first position, which corresponds to such a position of the closure element relative to the base element of the first closure part in which the engagement of the closure element with the engagement portion of the engagement element of the second closure part is eliminated. For example, by applying a force onto the closure element in the direction of this first position or—additionally or alternatively—for example by providing a locking element (as this will yet be explained below), the closure element thus is held in the open position so that closing of the closure device is easily and comfortably possible for a user.

When the closure device is closed, the first magnetic element on the at least one closure element and the second magnetic element on the second closure part cooperate in a magnetically attracting way. On the one hand, this provides a force of magnetic attraction between the closure parts, which magnetically supports the attachment of the closure parts to each other. On the other hand, the magnetic interaction of the first magnetic element on the closure element and of the second magnetic element on the second closure part effects that the at least one closure element is moved out of the first position and brought into engagement with the engagement portion of the engagement element. For this purpose, the magnetic elements for example are dimensioned such that at least when the magnetic elements have been moved towards each other sufficiently far, the force of magnetic attraction between the magnetic elements exceeds the application of a force onto the closure element in the direction of the first position so that the operative connection between the closure element and the engagement element is (automatically) produced. Because the magnetic interaction between the magnetic elements is strong in particular in the (relative) near field, the connection between the closure element and the engagement element only is produced when the closure parts have been moved towards each other sufficiently far so that the engagement between the closure element and the engagement portion of the engagement element can reliably be produced.

In the closed position, the at least one closure element is held in engagement with the engagement element due to the magnetic interaction between the first magnetic element on the closure element and the second magnetic element on the second closure part, so that the closure parts are connected to each other and thus are loadably held at each other in the closed position.

An application of force onto the at least one closure element of the first closure part in the open position can be effected in particular due to the magnetic effect of the first magnetic element. The first magnetic element of the closure element can magnetically cooperate with a further magnetic element of the first closure part so that the closure element is held in the first position due to the magnetic interaction, when the closure device is open. When the closure device is closed and the second closure part thus is moved towards the first closure part, the magnetic attraction between the first magnetic element of the closure element and the second magnetic element of the second closure part in the case of a sufficient approach exceeds the application of force onto the at least one closure element in the direction of the first position, so that the at least one closure element is moved out of the first position and brought into engagement with the engagement portion of the engagement element.

Additionally or alternatively, an application of force can, however, also be effected via other pretensioning elements, for example a mechanical spring element.

When the first closure part for example includes two closure elements, which cooperate for example in the manner of tongs and can each be brought into engagement with the engagement portion of the engagement element, the application of force can be effected for example by first magnetic elements, which are arranged on the closure elements, for example by magnetic repulsion between these first magnetic elements.

In one embodiment, the first closure part includes a locking element which in the open position acts on the at least one closure element with a locking portion in order to hold the at least one closure element in the first position. Such a locking element can be formed for example as an elastically resilient element, for example in the form of a rubber element or the like. The locking element effects that in the open position of the closure device the closure element cannot get out of the first position, but is locked in this first position by the locking element. For example, when two closure elements are provided on the first closure part, the locking element can rest between the closure elements with the locking portion so that the closure elements cannot be moved towards each other.

In one embodiment, the locking element includes a triggering portion that protrudes into an area into which the second closure part is introduced when the closure parts are attached to each other for closing the closure device. The triggering portion is formed to cooperate with the second closure part on closing of the closure device so that the locking element thereby is moved out of a locking position and thus releases the at least one closure element.

Alternatively, the locking element can however also be moved magnetically for example, in that the locking element or another component arranged on the first closure part for example magnetically cooperates with the second closure part and the locking element thereby is shifted so that on attachment of the closure parts to each other the locking element is moved out of its locking position by magnetic interaction.

Such a locking element can effect that the operative connection between the at least one closure element of the first closure part and the engagement portion of the engagement element of the second closure part only is produced when the closure parts are attached to each other (almost) completely and properly so that the locking between the closure parts can reliably be produced. Due to the fact that the locking element only is released mechanically by interaction with the second closure part, false locking due to too early movement of the at least one closure element can be prevented.

When using such a locking element, an (additional) application of force in the direction of the first position possibly can also be omitted. In such an embodiment, a closure device generally comprises a first closure part, which includes a base element and at least one closure element movable relative to the base element with a form-fitting portion arranged thereon, and a second closure part, which includes an engagement element with an engagement portion formed thereon. In an open position of the closure device, the first closure part and the second closure part are separated from each other and can be attached to each other along a closing direction for closing the closure device. The form-fitting portion of the at least one closure element can be brought into engagement with the engagement portion of the engagement element in an engagement direction substantially transversely to the closing direction, so that in a closed position the first closure part and the second closure part are held at each other along the closing direction. A first magnetic element is arranged on the first closure part, and a second magnetic element is arranged on the engagement element of the second closure part, wherein the first closure part includes a locking element which in the open position acts on the at least one closure element with a locking portion in order to hold the at least one closure element in a first position relative to the base element, wherein the second closure part is formed to (directly or indirectly) act on the locking element on closing, in order to release the at least one closure element so that the at least one closure element with the form-fitting portion is moved relative to the base element out of the first position in the engagement direction, in order to bring the form-fitting portion into engagement with the engagement portion of the engagement element.

When the closure device is to be opened again, the at least one closure element can be actuated in order to bring the closure element out of engagement with the engagement element against the magnetic attraction between the first magnetic element and the second magnetic element. When the operative connection between the at least one closure element and the engagement portion of the engagement element is eliminated, the closure parts can be separated from each other. Because on opening, the first magnetic element on the closure element also is moved relative to the second magnetic element on the engagement element and thus a magnetic attraction between the magnetic elements is weakened (or possibly even reversed into a magnetic repulsion), opening can be effected in a simple, comfortable way.

Actuating the at least one closure element for example can be effected manually by a user, in that a user grasps an actuating portion of the closure element and moves the closure element. For example, actuating the closure element can however also be effected via an actuating mechanism (for example by using an actuating element in the form of a lever or a pusher) by means of a linkage, pull cords or ropes, a power transmission via a gear box or force-deflecting slopes, an eccentric element or the like.

Additionally or alternatively, an actuation of the at least one closure element can be effected magnetically, for example by reversing the polarity of the second magnetic element of the second closure part, for example in that the second magnetic element can be rotated or shifted mechanically on the second closure part in such a way that instead of an unlike pole a like pole is arranged to face the first magnetic element of the closure element of the first closure part, and thus a magnetic attraction is reversed into a magnetic repulsion. The closure element thereby can magnetically be moved out of engagement with the engagement portion of the engagement element.

In one embodiment, the at least one closure element can be pivoted about a pivot axis relative to the base element. The pivot axis can extend along the closing direction, perpendicularly to the closing direction, or also at an oblique angle to the closing direction. The pivot axis here is spaced apart from the engagement portion of the engagement element of the second closure part such that the at least one closure element of the first closure part can be brought into engagement with the engagement portion of the engagement element transversely, for example at least approximately perpendicularly, or along a circular path specified by an associated pivot axis.

For pivotable mounting, the at least one closure element for example can be coupled to the base element via an axle element so that the at least one closure element is rotatable relative to the base element about the axle element.

As an alternative to such a pivotability, the at least one closure element for example can be shiftable relative to the base element. For example, the closure element can be movable relative to the base element along a linear shifting path or along a curved shifting path. In the first position, the closure element is offset towards the outside transversely to the closing direction. On closing of the closure device, the at least one closure element is brought into operative connection with the engagement portion of the engagement element along the engagement direction transversely to the closing direction so that the closure parts are connected to each other and are held at each other in the closed position.

In one embodiment, the at least one closure element includes a claw portion that forms a form-fitting portion for positively engaging behind the engagement portion. The claw portion for example can have the shape of a half shell, wherein the form-fitting portion for example extends along a circular arc around the closing direction. The form-fitting portion preferably is adapted to the shape of the engagement element of the second closure part, which for example is rotationally symmetrically formed around the closing direction.

In another embodiment, the form-fitting portion can also be configured in the form of a pin that forms a positive connection with the engagement portion receiving the pin.

The form-fitting portion for example is axially offset from the first magnetic element arranged on the at least one closure element. For example, the first magnetic element can be arranged on a wall portion of the claw portion axially spaced apart from the form-fitting portion and extending perpendicularly to the closing direction, so that on closing of the closure device a magnetic attraction between the first magnetic element on the closure element and the second magnetic element on the engagement element exists both along the closing direction and along the engagement direction directed transversely to the closing direction, and the closure parts thus are drawn towards each other, and the closure element and the engagement element also are brought into engagement with each other.

The first magnetic element of the at least one closure element and the form-fitting portion for example can be rigidly connected to each other. Alternatively, the form-fitting portion and the first magnetic element also can elastically be movable relative to each other, which for example can allow to produce a backlash-free connection between the closure parts and to compensate tolerances in the connection.

The base element can be realized for example by a housing element of the first closure part relative to which the at least one closure element can be adjusted. The base element can, however, also be realized by another (substantially identically constructed, but for example mirror-inverted) closure element so that closure elements are adjustable relative to each other and for example are mounted on each other in the manner of tongs, without an additional housing element being present.

In one embodiment, the first closure part includes two closure elements and two first magnetic elements each arranged on one of the closure elements. The closure elements can each be brought into engagement with the engagement element of the second closure part, wherein the closure elements are movable in mutually opposite directions and thus can be brought into engagement with the engagement portion of the engagement element of the second closure part from different sides.

The two closure elements for example can each be pivotally arranged on a base element in the form of a housing element of the first closure part. Alternatively, the closure elements are movably arranged on each other.

In the closed position, for example, the two closure elements can receive the engagement element between themselves in such a way that a first one of the closure elements comes to lie on a first side of the engagement element and a second one of the closure elements comes to lie on a second side of the engagement element. In the closed position, the closure elements thus enclose the engagement element so that a secure, loadable connection thereby is produced between the closure parts.

For example, the closure elements each can include a claw portion with a circular arc-shaped form-fitting portion so that the closure elements enclose the engagement element by an angle (measured around the closing direction) greater than 180°, preferably greater than 270°, more preferably greater than 315°.

In one embodiment, the closure elements are forcibly coupled to each other via a coupling device for a joint movement. This means that the closure elements are not movable, for example pivotable independently of each other, but that a movement of the one closure element always is accompanied by a movement of the other closure element. Thus, the closure elements only are movable synchronously to each other, wherein the movement of the closure elements need not necessarily be uniform, but a movement of the one closure element for example is converted into a movement of the other closure element in a way stepped up or stepped down.

When the closure elements for example each are pivotally mounted on a base element of the first closure part, the forced coupling can effect that pivoting of the one closure element always is accompanied by pivoting also of the other closure element, wherein the closure elements preferably are pivoted in mutually opposite directions. As a result, it is possible that on closing of the closure device the closure elements are synchronously brought into engagement with the engagement element of the second closure part from different sides and, on opening of the closure device, the closure elements analogously are synchronously moved out of engagement with the engagement element.

Such a forced coupling can be produced mechanically. For example, the closure elements each can have a toothing, wherein due to the meshing engagement of the toothings, the closure elements only can be moved in dependence on each other. Alternatively, a forced coupling can also be produced via a linkage, a disk clutch, a belt coupling or another coupling device.

In one embodiment, a force is applied onto the closure elements in the open position due to the repelling effect of the first magnetic elements relative to each other. Each closure element preferably includes a first magnetic element, wherein the first magnetic elements for example face each other in a magnetically repelling way, and in the open position of the closure device the closure elements thus are pressed away from each other by the first magnetic elements. This can be achieved in that the first magnetic elements face each other with like poles or their direction of magnetization is vertically aligned with the engagement direction. When the closure parts are moved towards each other, the force of magnetic attraction between the first magnetic elements of the closure elements of the first closure part and the second magnetic element of the second closure part, after the closure parts have sufficiently been moved towards each other, exceeds the magnetic repulsion among the first magnetic elements, so that the closure elements for example are drawn towards each other with their claw portion, and the engagement between the closure elements and the engagement element of the second closure part thus is produced.

In principle, the magnetic elements of the first closure part and of the second closure part can be produced by permanent magnets, electromagnets or by passive magnetic armatures, for example made of a ferromagnetic material.

When the first closure part for example includes merely one closure element, the first magnetic element can be formed by a permanent magnet or a magnetic armature. In the first case, the second magnetic element of the second closure part is designed as a permanent magnet or magnetic armature, in the second case as a permanent magnet.

When the first closure part includes two closure elements movable relative to each other, a first magnetic element in the form of a permanent magnet for example can be arranged on each closure element. In this case, the second magnetic element for example can likewise be formed by a permanent magnet or alternatively by a magnetic armature.

It is also conceivable, however, that for example a first magnetic element is formed by a permanent magnet and the other first magnetic element is formed by a magnetic armature, wherein the application of force between the closure elements of the first closure part for example is effected by a mechanical pretension, for example via a spring element. In this case, the second magnetic element can be formed by a permanent magnet or also by a magnetic armature.

It is also conceivable that the second magnetic element is realized by a permanent magnet, but the first magnetic elements of the closure elements of the first closure part each are realized by a magnetic armature. In this case, too, the application of force between the closure elements of the first closure part for example is effected by a mechanical pretension, for example via a spring element.

In one embodiment, the first closure part includes a pretensioning element that is configured to load the at least one closure element in the engagement direction. Such a pretensioning element can be formed for example by a mechanical spring, wherein such a pretensioning element can be used to set the first position, in which the at least one closure element is disposed when the closure device is open, in a defined way. The pretensioning element for example can be tensioned the stronger the further the closure element is adjusted relative to the base element against the engagement direction. When an application of force decreases due to a magnetic action on the closure element against the engagement direction, the first position corresponds to the position of the closure element in which the force of the pretensioning element and the application for example of a magnetic force are in equilibrium.

In one embodiment, the first closure part has at least one first electrical contact and the second closure part has at least one second electrical contact. In the closed position of the closure device, the at least one first electrical contact and the at least one second electrical contact are electrically contacted with each other. The at least one electrical contact of the first closure part can be arranged for example on the at least one closure element. The at least one second electrical contact of the second closure part on the other hand can be arranged for example on the engagement element.

For example, each closure part can include several contact elements so that a multipole electrical connection can be produced via the closure device.

Producing the electrical contact and the mechanical connection can be effected for example in a temporally staggered way. It can be advantageous here that on closing first the mechanical connection is produced and temporally thereafter the electrical contacting between the contact elements is effected. This can allow in particular that on closing and also on opening the contact elements of the closure parts do not rub over each other, but on closing the electrical contacting in the engagement direction transversely to the closing direction only is effected after the mechanical connection has been produced already, and on opening the electrical contacting first is eliminated against the engagement direction, before the mechanical connection is released.

In one embodiment, the closure device includes a display device for indicating the position of the closure device. Via such a display device it can be indicated in particular whether the closure device is in the open position or in the closed position. Such a display device can be realized for example by a colored marking for example in a window of the base element of the first closure part, wherein the colored marking indicates the position of the at least one closure element relative to the base element. In another embodiment, such a display device can be realized for example by a pin element which in the open position takes a first position relative to the base element and in the closed position takes another, second position relative to the base element and thus clearly indicates the position of the closure device.

A closure device as described above can be used for example to produce a plug connection for electrical or electronic devices.

Such a closure device can also be used for bags, items of clothing, shoes or other textile assemblies.

The closure device can also be used as a closure for a suitcase or as a safety closure for example for a life jacket or the like. For example, the closure device can be used for or on vehicles or for personal protective equipment.

The closure device can also be used as a coupling, for example for connecting several containers, for example several suitcases or bags, to each other.

The closure device can also be used for coupling electrical or electronic devices to each other, for example for signal transmission or power supply.

Via the closure device, a highly loadable closure can also be provided, which can be used for example for connecting a vehicle to a trailer or the like.

The closure device can be also be used for example as a cable or belt closure.

BRIEF DESCRIPTION OF THE DRAWINGS

The idea underlying the solution will be explained in detail below with reference to the exemplary embodiments illustrated in the Figures.

FIG. 11A shows a view of the closure device, on further closing.

FIG. 11B shows a top view of the closure device.

FIG. 13 shows an exploded view of the closure device of FIGS. 8A to 12D.

FIG. 14A shows a view of again another exemplary embodiment of a closure device, in an open position.

FIG. 14B shows a top view of the closure device.

FIG. 15A shows a view of the closure device, in a closed position.

FIG. 15B shows a top view of the closure device.

FIG. 16A shows a view in turn of another exemplary embodiment of a closure device, in an open position.

FIG. 16B shows a top view of the closure device.

FIG. 16C shows a sectional view along line A-A of FIG. 16B.

FIG. 17A shows a view of the closure device, in a closed position.

FIG. 27 shows a schematic view of an electrical contacting between closure parts.

DESCRIPTION OF THE INVENTION

FIGS. 1A, 1B to FIGS. 5A-5D show a first exemplary embodiment of a closure device 1, which includes two closure parts 2, 3 that can be attached to each other along a closing direction X1 and are mechanically locked to each other in a closed position so that assemblies associated to the closure parts 2, 3 are connected to each other via the closure parts 2, 3.

Figure 1A:
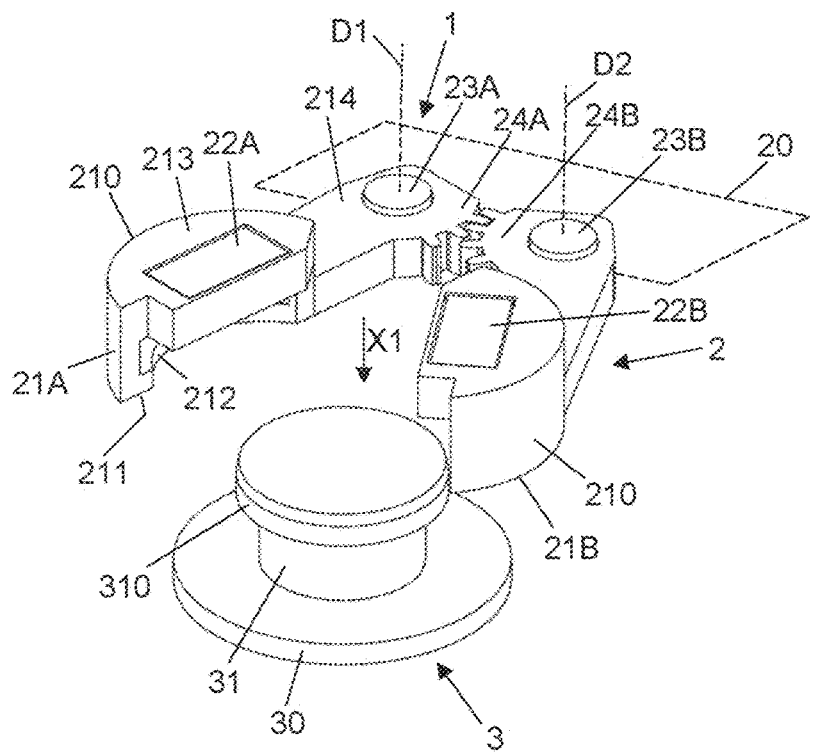
FIG. 1A shows a perspective view of an exemplary embodiment of a closure device, in an open position.
Figure 1B:
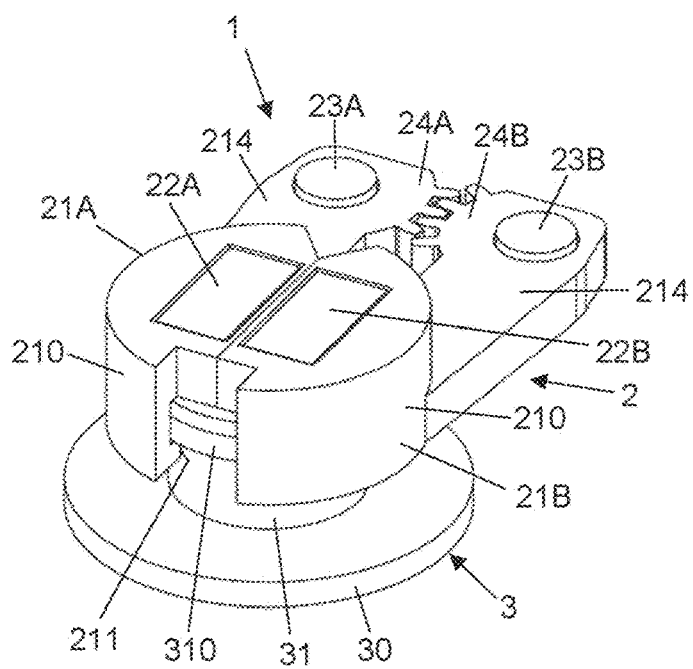
FIG. 1B shows a view of the closure device of FIG. 1A, in a closed position.
Figure 2:
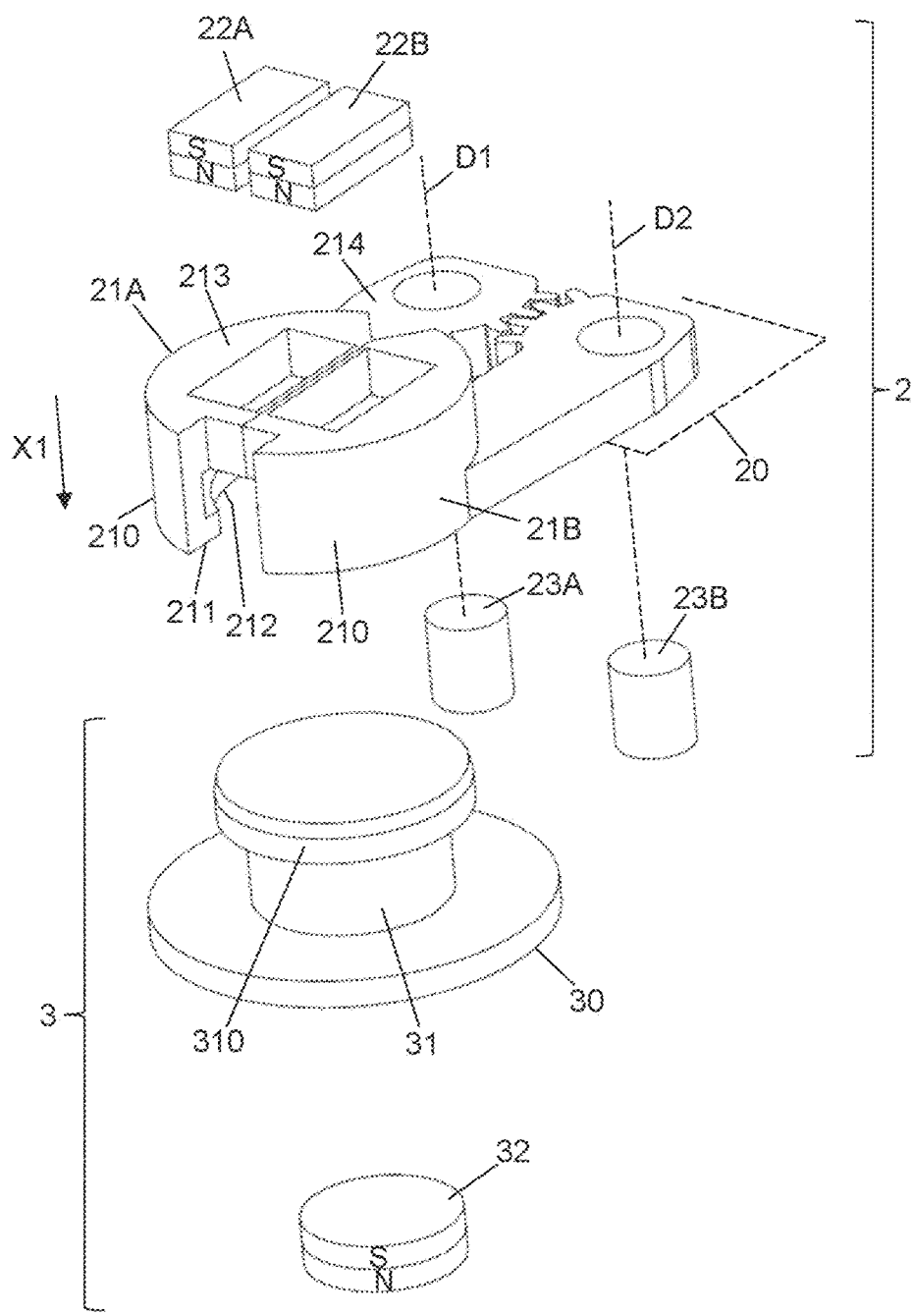
FIG. 2 shows an exploded view of the closure device.
Figure 3A:
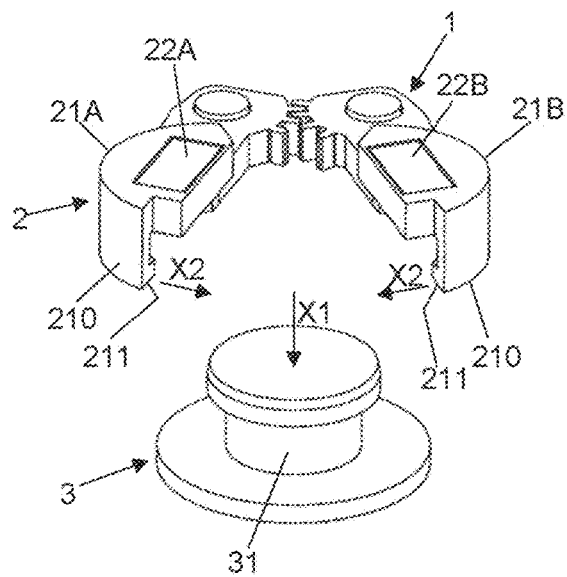
FIG. 3A shows a view of the closure device In the open position.
Figure 3B:
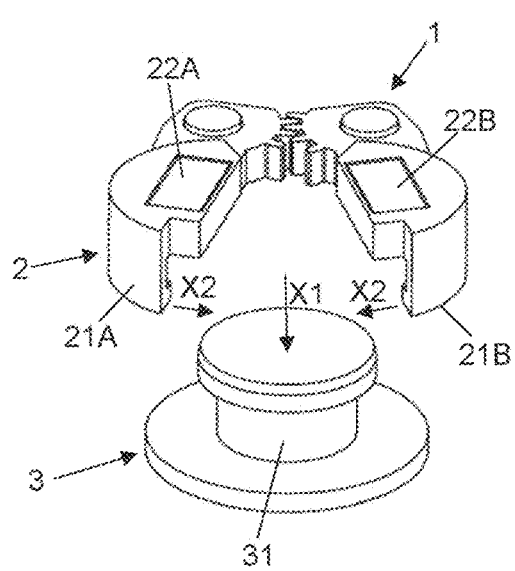
FIG. 3B shows a view of the closure device on closing.
Figure 3C:
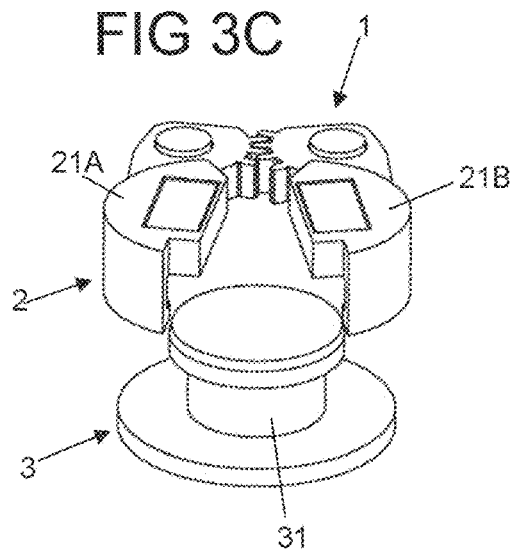
FIG. 3C shows a view of the closure device on further closing.
Figure 3D:
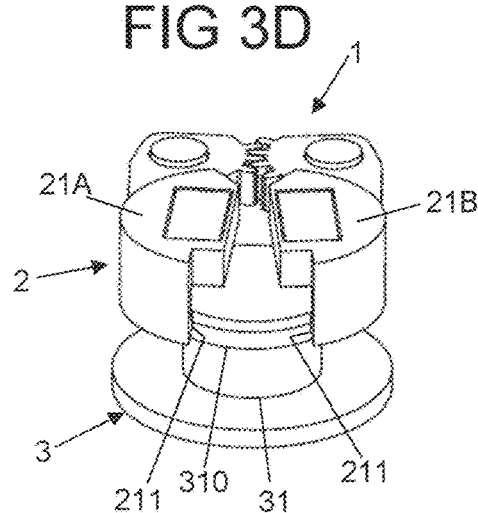
FIG. 3D shows a view of the closure device on further closing.
Figure 3E:
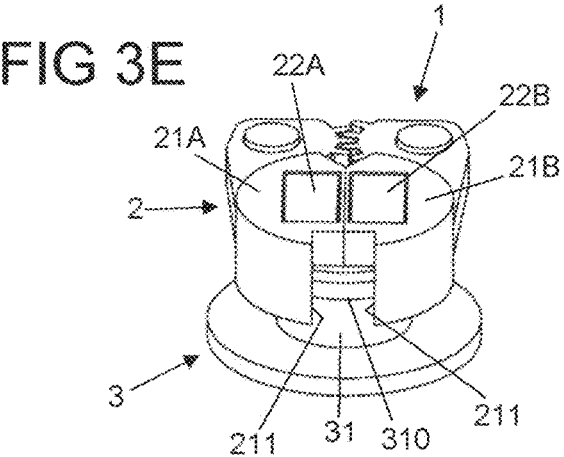
FIG. 3E shows a view of the closure device in the closed position.
Figure 4A:
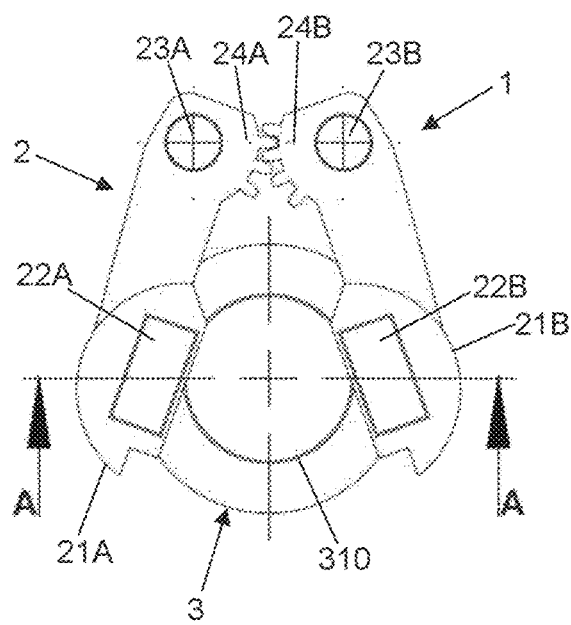
FIG. 4A shows a top view of the closure device in the open position.
Figure 4B:
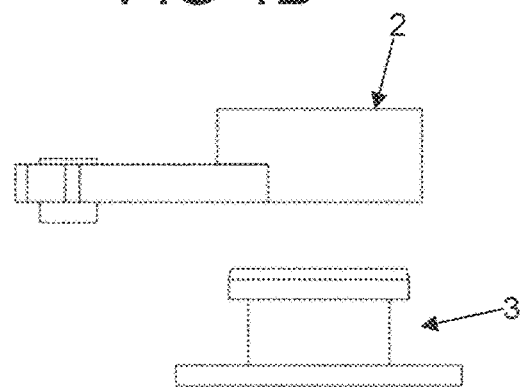
FIG. 4B shows a side view of the closure device.
Figure 4C:
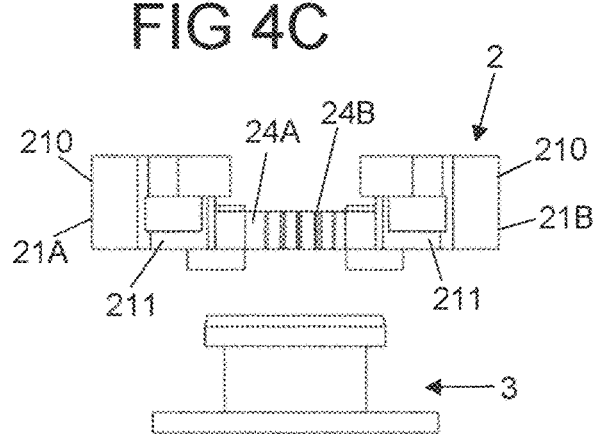
FIG. 4C shows a front view of the closure device.
Figure 4D:
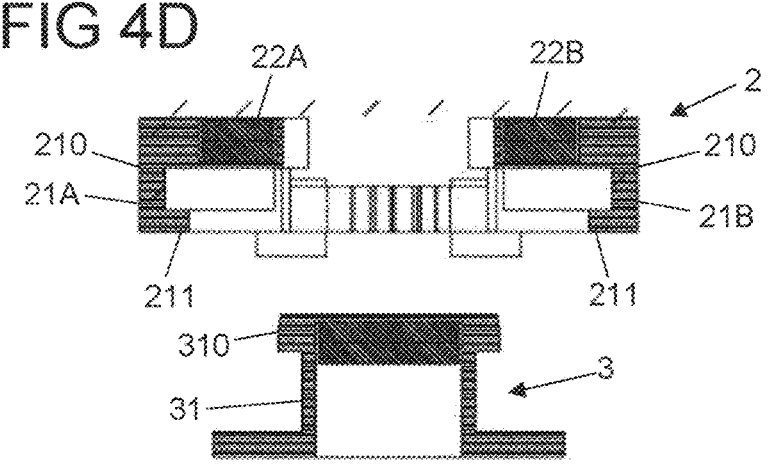
FIG. 4D shows a sectional view along line A-A of FIG. 4A.
Figure 5A:
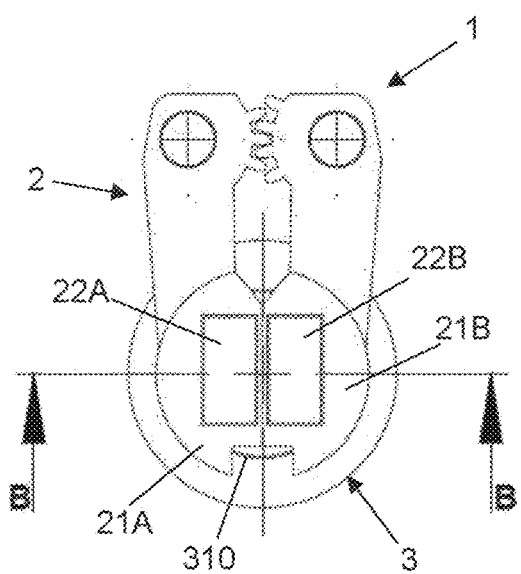
FIG. 5A shows a top view of the closure device in the closed position.
Figure 5B:
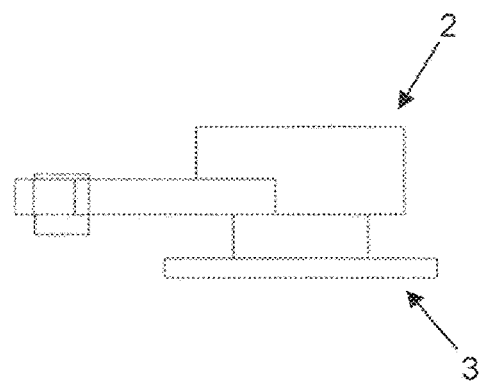
FIG. 5B shows a side view of the closure device.
Figure 5C:
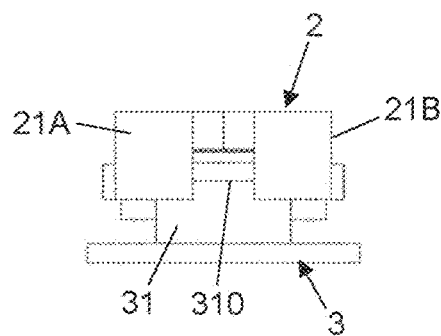
FIG. 5C shows a front view of the closure device.
Figure 5D:
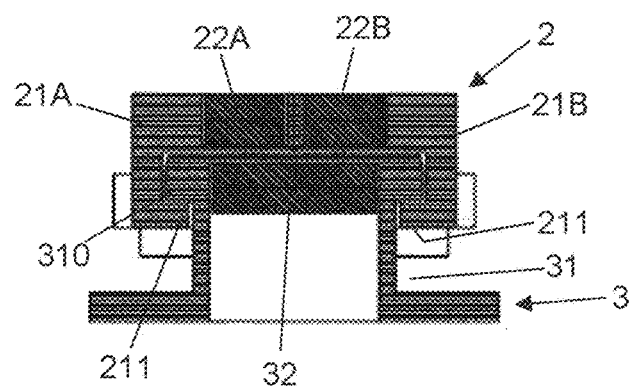
FIG. 5D shows a sectional view along line A-A of FIG. 5A.

Initially with reference to the exploded view of FIG. 2, the closure part 2 includes a base element in the form of a housing element 20 on which two closure elements 21A, 21B are pivotally mounted via axle elements 23A, 23B. The closure elements 21A, 21B each include a claw portion 210 in the form of a half shell, which jointly serve to produce a locking with an engagement element 31 of the closure part 3.

The claw portions 210 each form a form-fitting portion 211 which extends approximately semicircularly along a circular arc around the closing direction X1 and with an inner edge portion 212 can be moved towards the engagement element 31 of the closure part 3. At a wall portion 213 facing away from the form-fitting portion 211 and axially spaced apart from the form-fitting portion 211 along the closing direction X1, one magnetic element 22A, 22B each is arranged in each of the closure elements 21A, 21B. Via one shank portion 214 each the closure elements 21A, 21B are coupled to the axle elements 23A, 23B and thereby pivotally mounted on the housing element 20 so that the closure elements 21A, 21B can be pivoted relative to the housing element 20 and also relative to each other.

In the illustrated exemplary embodiment, pivot axes D1, D2 specified by the axle elements 23a, 23B are directed along the closing direction X1. The pivot axes D1, D2 here are spaced apart from the engagement element 31 of the closure part 3 (in particular from an axis of rotational symmetry of the engagement element 31) transversely to the closing direction X1, so that the claw portions 210 with the form-fitting portions 211 formed thereon can be brought into engagement with an engagement portion 310 of the closure part 3 formed on the engagement element 31 transversely to the closing direction X1 in a plane directed perpendicularly to the closing direction X1.

It should be noted that in another embodiment the pivot axes D1, D2 can, however, also be arranged in a different relation to the closing direction. In another embodiment, for example, it is conceivable that the same extend in a plane that is perpendicular to the closing direction or is directed obliquely to the closing direction.

In the region of the axle elements 23A, 23B a coupling device 24A, 24B in the form of a toothed portion is formed on each shank portion 214. By meshing engagement of the toothed portions with each other, the closure elements 21A, 21B are forcibly coupled to each other so that pivoting of the one closure element 21A, 21B always is accompanied by synchronous, but oppositely directed pivoting of the other closure element 21B, 21A.

The closure part 3 has a base body 30 on which the engagement element 31 is arranged. A magnetic element 32 is enclosed in the engagement element 31 and serves for magnetically cooperating with the magnetic elements 22A, 22B of the closure elements 21A, 21B.

The magnetic elements 22A, 22B of the closure elements 21A, 21B can be formed by permanent magnets or by magnetic armatures or electromagnets. The magnetic element 32 of the closure part 3 likewise can be formed by a permanent magnet or a magnetic armature, wherein at least one of the magnetic elements 22a, 22B, 32 is formed by a permanent magnet or electromagnet.

In the illustrated exemplary embodiment, the magnetic elements 22A, 22B, 32 for example are formed by one permanent magnet each. The magnetic elements 22A, 22B of the closure elements 21A, 21B here are arranged codirectionally with respect to each other and for example with like poles point towards the engagement element 31 of the closure part 3, as this is shown in FIG. 2, so that a magnetic repulsion exists between the magnetic elements 22A, 22B transversely to the closing direction X1. The magnetic element 32 on the other hand is directed towards the magnetic poles of the magnetic elements 22A, 22B with an unlike pole so that a force of magnetic attraction exists between the magnetic elements 22A, 22B on the one hand and the magnetic element 32.

In the illustrated exemplary embodiment, the directions of magnetization of the magnetic elements 22A, 22B (corresponding to the direction vector from the north pole N towards the south pole S) are unidirectional and directed parallel to the closing direction (see FIG. 2). Thus, a magnetic repulsion exists between the magnetic elements 22A, 22B transversely to the closing direction X1. The magnetic elements 22A, 22B can, however, also point towards each other with like poles so that the directions of magnetization of the magnetic elements 22A, 22B are directed perpendicularly to the closing direction X1 and oppositely to each other.

FIGS. 3A to 3E show the closure device 1 on closing. FIGS. 4A to 4D show views of the closure device 1 in an open position before closing. FIGS. 5A to 5D show views in the closed position after closing.

When the closure parts 2, 3 are attached to each other along the closing direction X1 for closing the closure device 1, the closure elements 21A, 21B are moved towards the engagement element 31. In the open position before closing, shown in FIG. 3A as well as FIGS. 4A to 4D, the closure elements 21A, 21B are in a first, open position in which the claw portions 210 are spaced apart from each other oppositely to an engagement direction X2 directed transversely to the closing direction X1. In this open position, the closure elements 21A, 21B in the illustrated exemplary embodiment are held between the magnetic elements 22A, 22B of the closure elements 21A, 21B due to the magnetically repelling effects.

When moving the closure elements 21A, 21B towards the engagement element 31, the magnetic attraction between the magnetic elements 22A, 22B on the one hand and the magnetic element 32 on the other hand becomes stronger and stronger so that the closure elements 21A, 21B are drawn towards each other against the magnetic repulsion between the magnetic elements 21A, 21B. When the closure elements 21A, 21B have sufficiently been moved towards the engagement element 31, as this is shown at the transition from FIG. 3B towards FIG. 3E, the force of magnetic attraction from the magnetic element 32 to the magnetic elements 22A, 22B exceeds the magnetic repulsion among the magnetic elements 22A, 22B so that the closure elements 21A, 21B are brought in contact with each other in the engagement direction X2 transversely to the closing direction X1 and the form-fitting portions 211 on the inside of the claw portions 210 of the closure elements 21A, 21B thereby are in engagement with the engagement portion 310 of the engagement element 31, as this can be taken from FIG. 3E in a synopsis with FIGS. 5A to 5D.

In the closed position, the closure parts 2, 3 thus are positively connected to each other and, due to the fact that the closure elements 21A, 21B positively enclose the engagement element 31 with their claw portions 210 in the region of the engagement portion 310, are loadably held at each other.

In the illustrated exemplary embodiment, the form-fitting portions 211 are shaped as rigid inwardly protruding protrusions inside the claw portions 210. The engagement portion 310 at the engagement element 31 is shaped as a radially protruding protrusion portion at the engagement element 31, which circumferentially extends around the closing direction X1.

Due to the forced coupling via the coupling devices 24A, 24B, the pivotal movement of the closure elements 21A, 21B on closing always is effected synchronously. Thus, the form-fitting portions 211 are synchronously and thus uniformly brought into engagement with the engagement portion 311 of the engagement element 31 so that the locking between the closure parts 2, 3 is produced safely and reliably.

In the exemplary embodiment shown in FIGS. 6A-6D and 7A-7D, the closure part 2 additionally includes a locking element 25 in the form of an elastically adjustable element, for example in the form of a spring element which in the open position rests between the closure elements 21A, 21B and thus locks the same in the open position. The locking element 25 forms a locking portion 250 in the form of a bar extending transversely to the closing direction X1, which in the open position holds the closure elements 21A, 21B at a distance to each other. Via a triggering portion 251, the locking element 25 is fixed to the housing element 20 of the closure part 2, wherein the triggering portion 251 is elastically deformable and the locking element 25 thus can be shifted for unlocking.

Figure 6A:
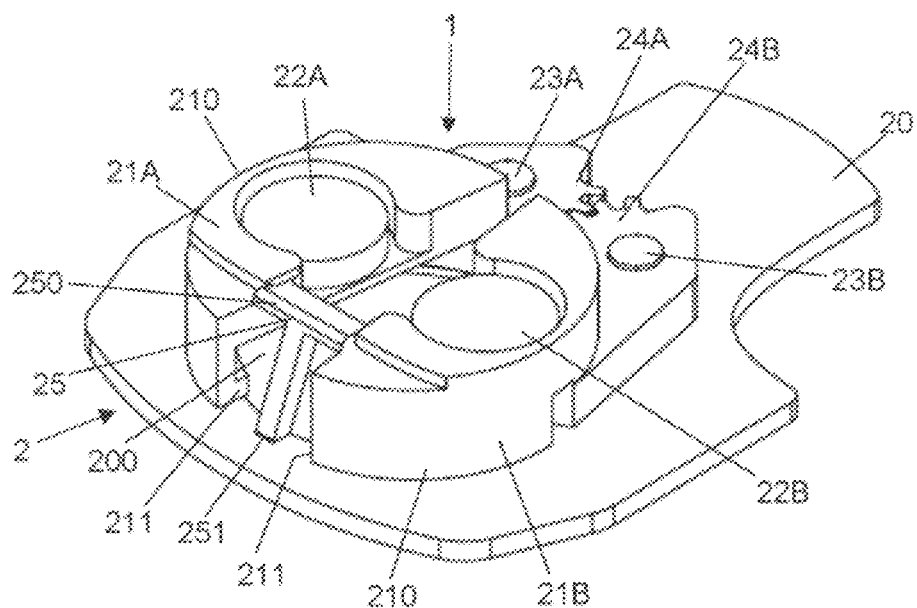
FIG. 6A shows a view of another exemplary embodiment of a closure device, in an open position.
Figure 6B:
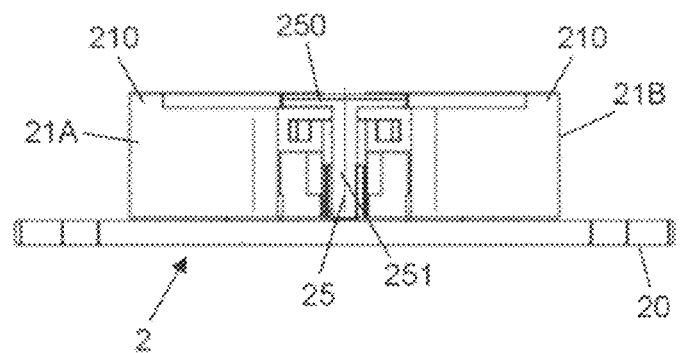
FIG. 6B shows a front view of the closure device of FIG. 6A.
Figure 6C:
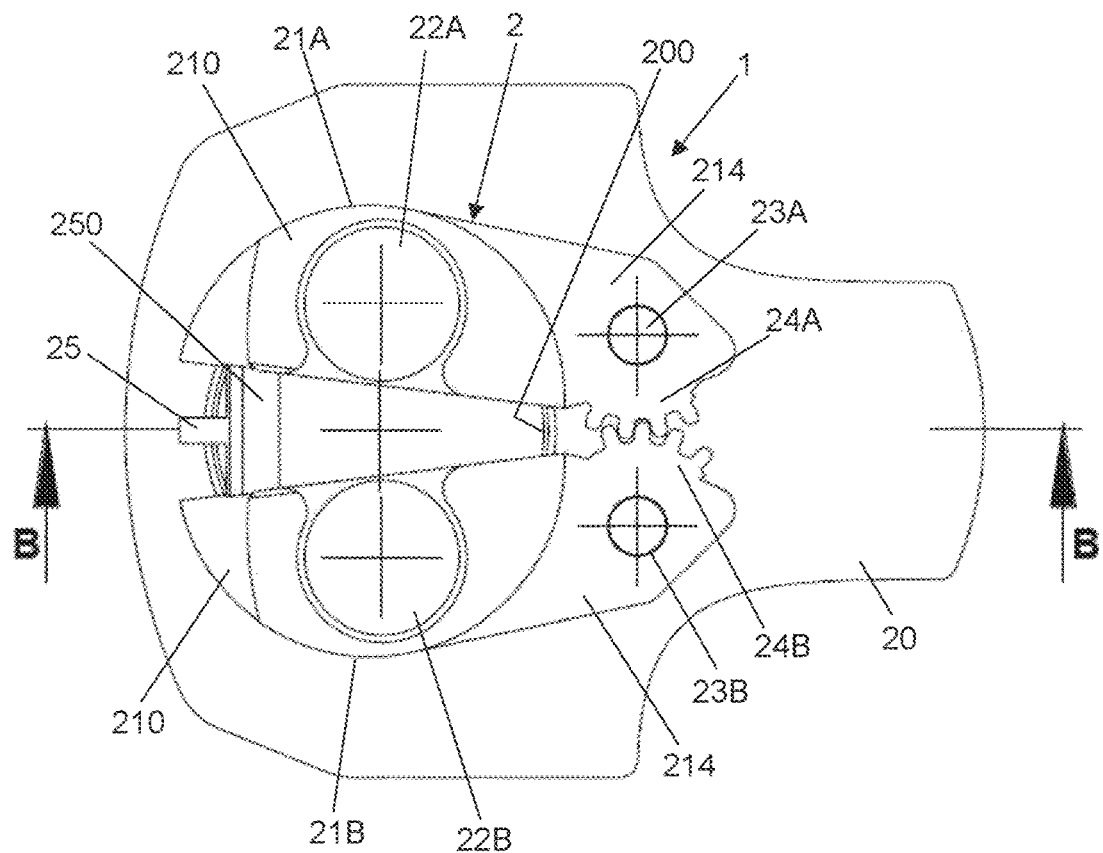
FIG. 6C shows a top view of the closure device.
Figure 6D:
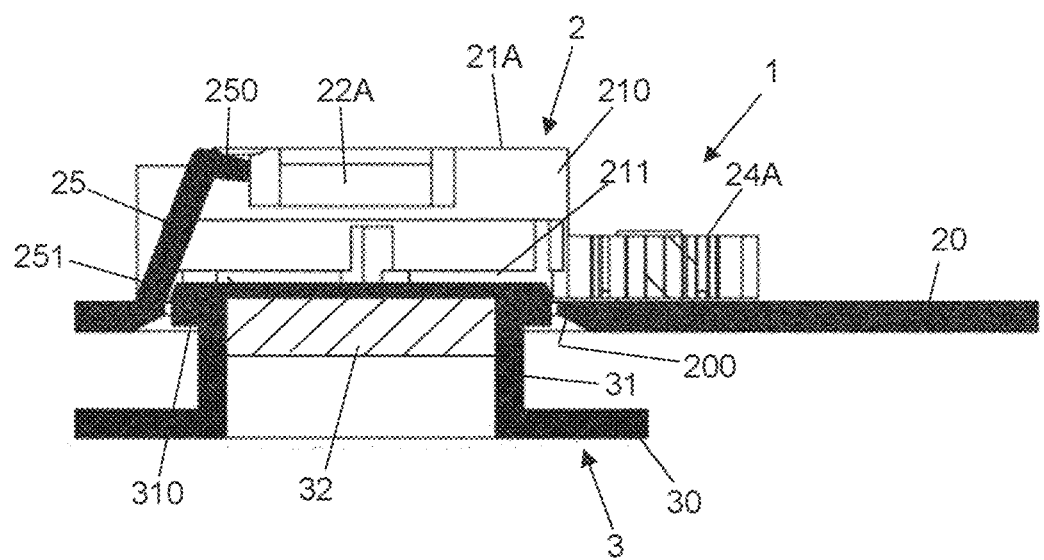
FIG. 6D shows a sectional view along line B-B of FIG. 6C.
Figure 7A:
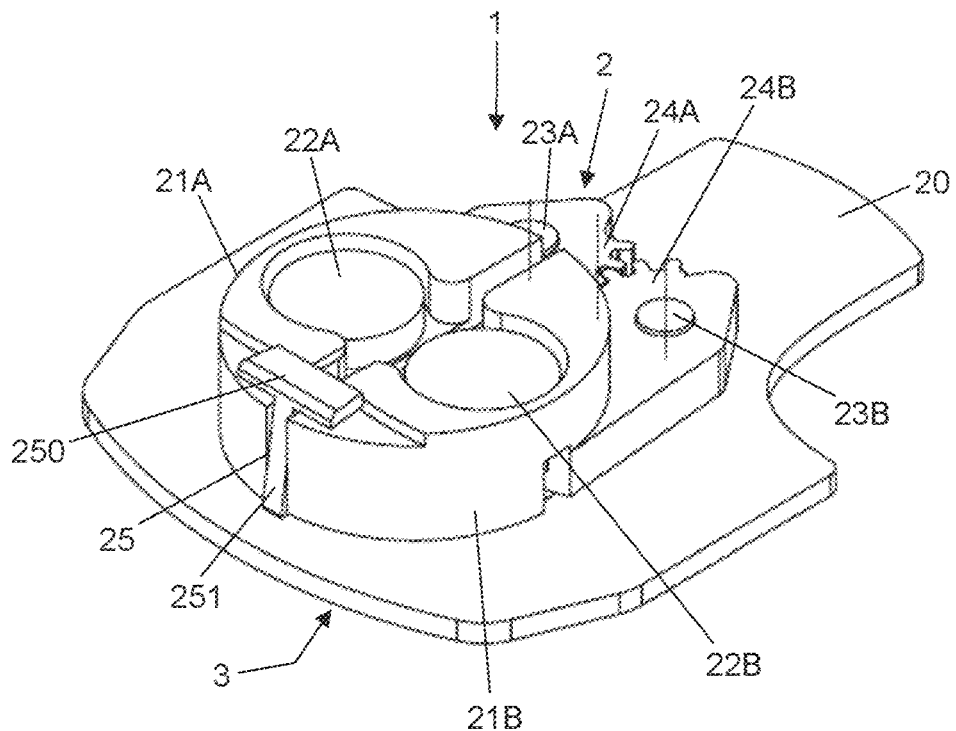
FIG. 7A shows a view of the closure device, in a closed position.
Figure 7B:
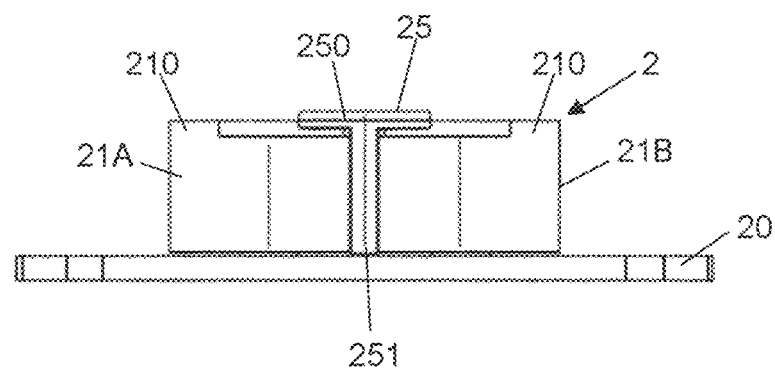
FIG. 7B shows a front view of the closure device of FIG. 7A.
Figure 7C:
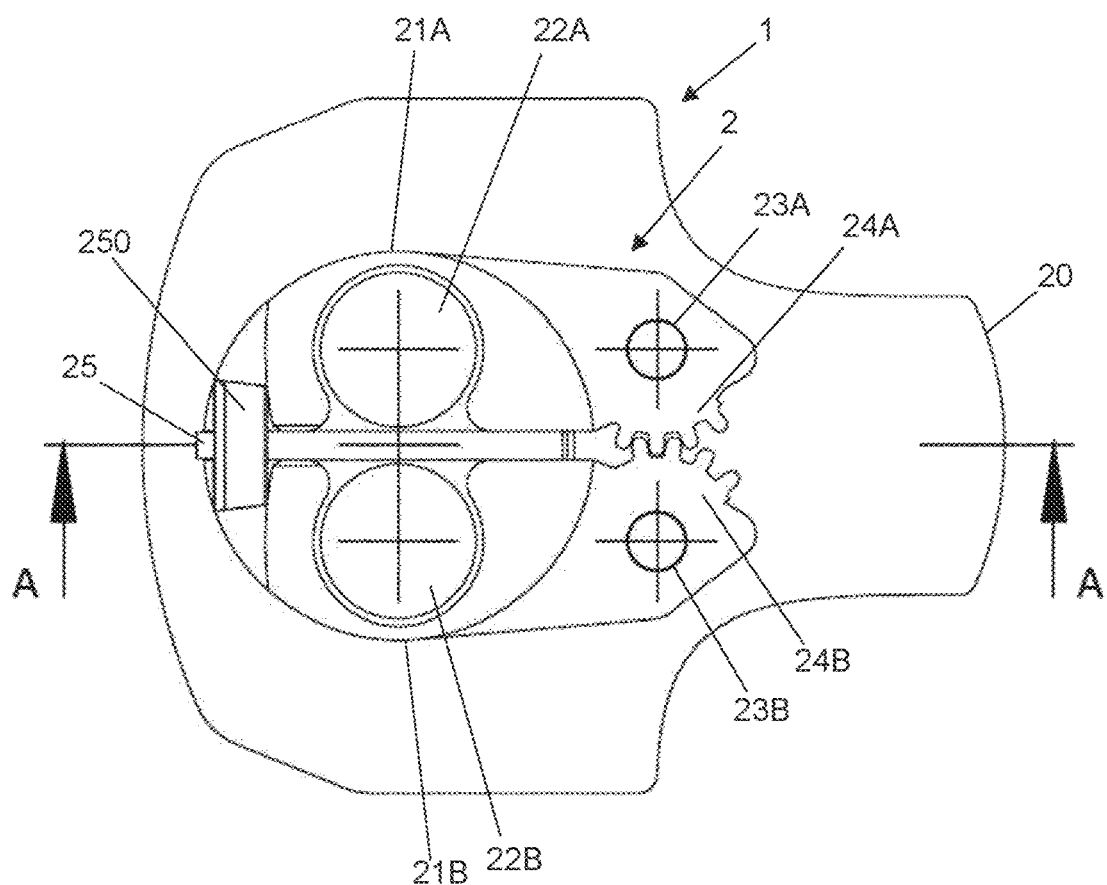
FIG. 7C shows a top view of the closure device.
Figure 7D:
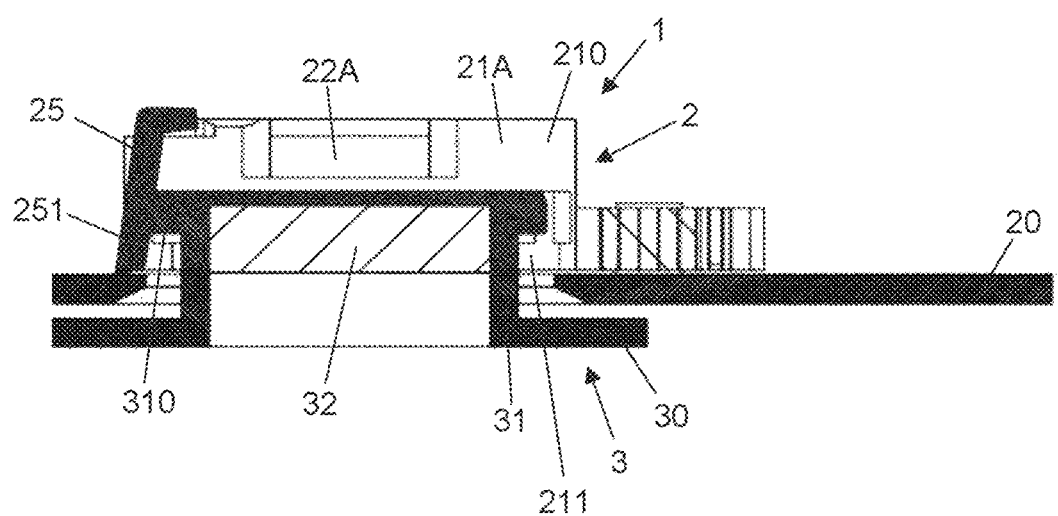
FIG. 7D shows a sectional view along line A-A of FIG. 7C.
Figure 8A:
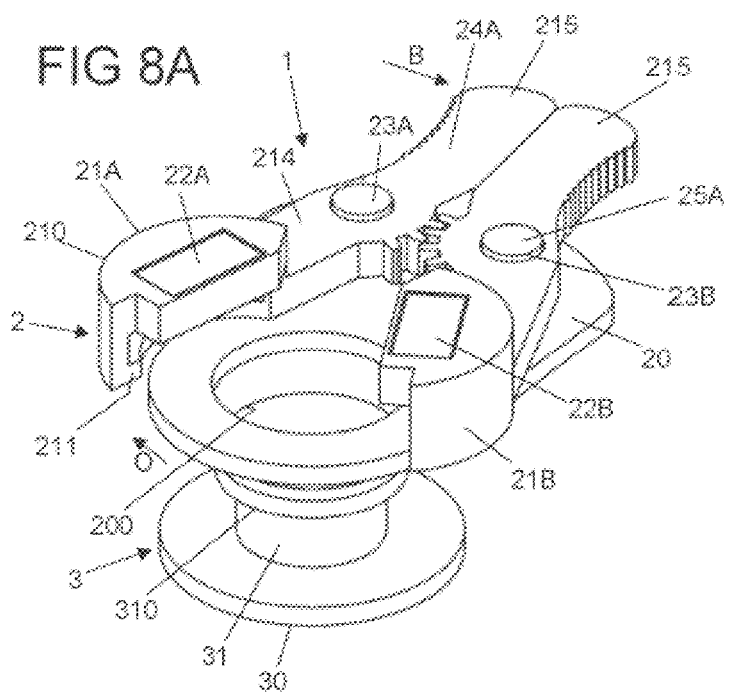
FIG. 8A shows a view of again another exemplary embodiment of a closure device, in an open position.
Figure 8B:
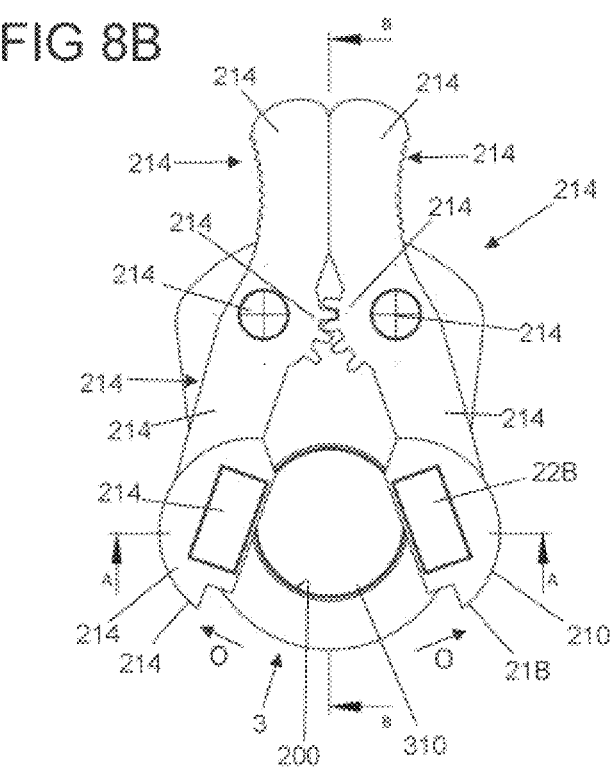
FIG. 8B shows a top view of the closure device.
Figure 8C:
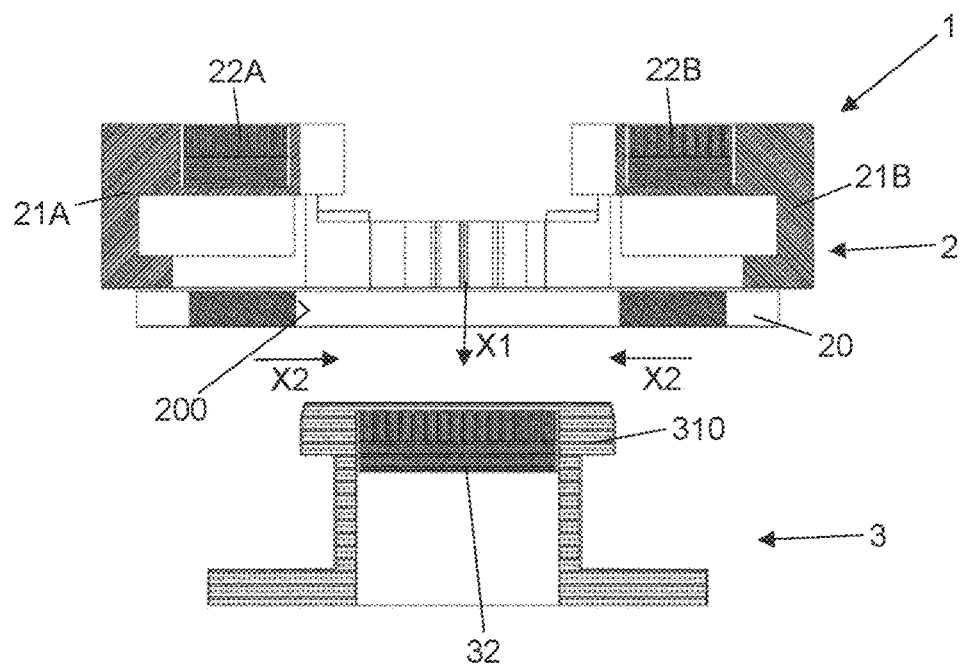
FIG. 8C shows a sectional view along line A-A of FIG. 8B.
Figure 8D:
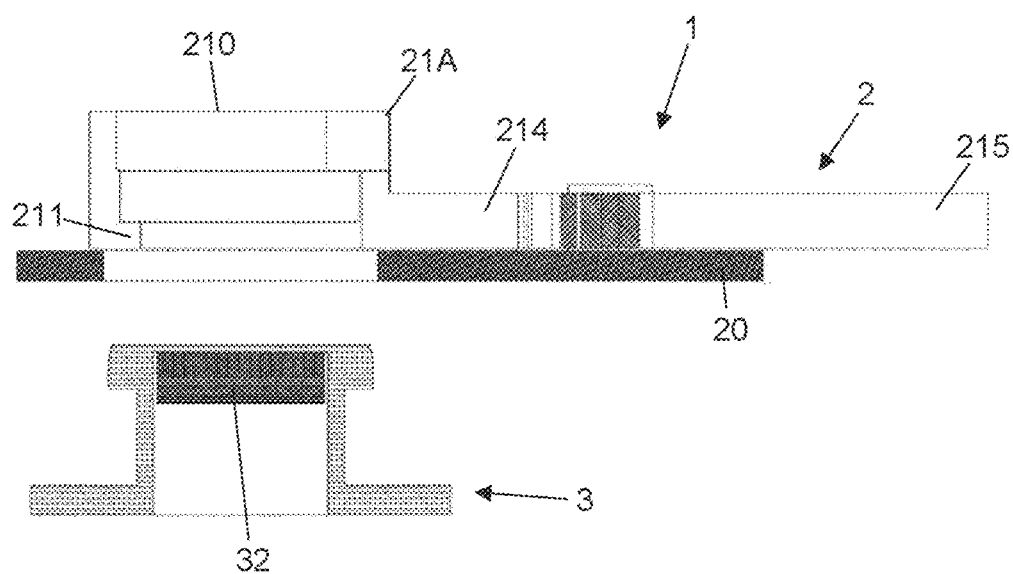
FIG. 8D shows a sectional view along line B-B of FIG. 8B.
Figure 9A:
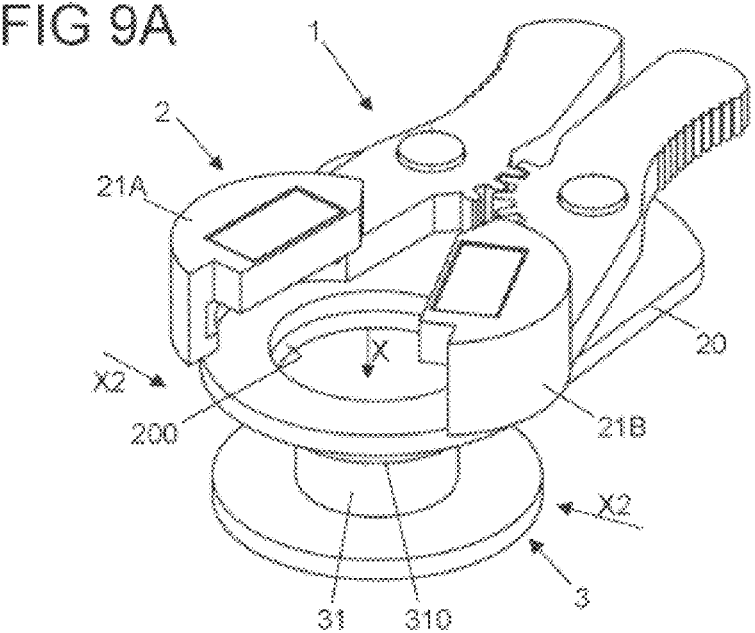
FIG. 9A shows a view of the closure device, on closing.
Figure 9B:
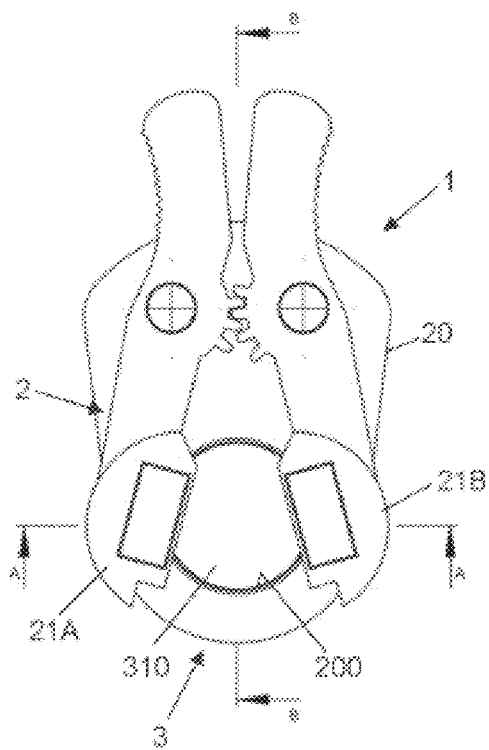
FIG. 9B shows a top view of the closure device.
Figure 9C:
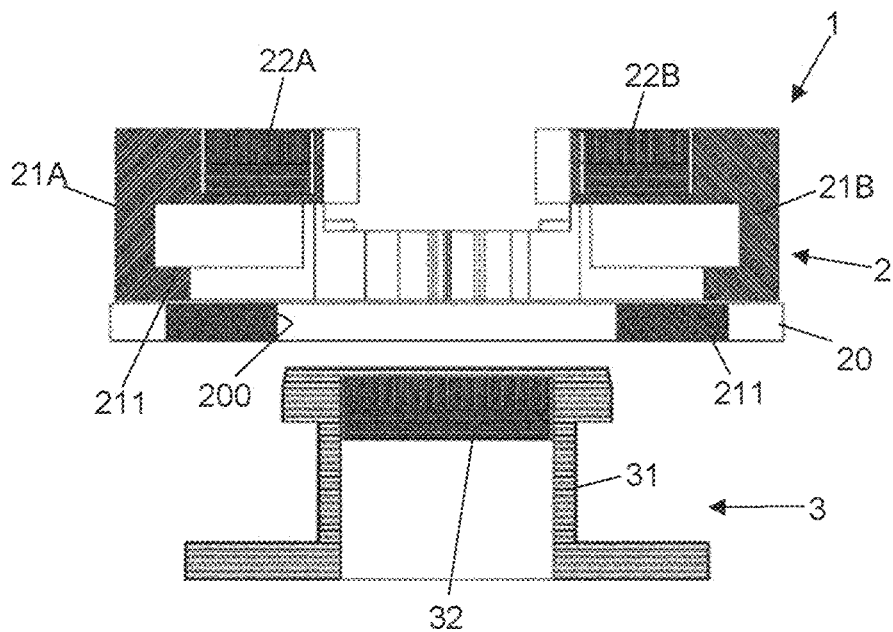
FIG. 9C shows a sectional view along line A-A of FIG. 9B.
Figure 9D:
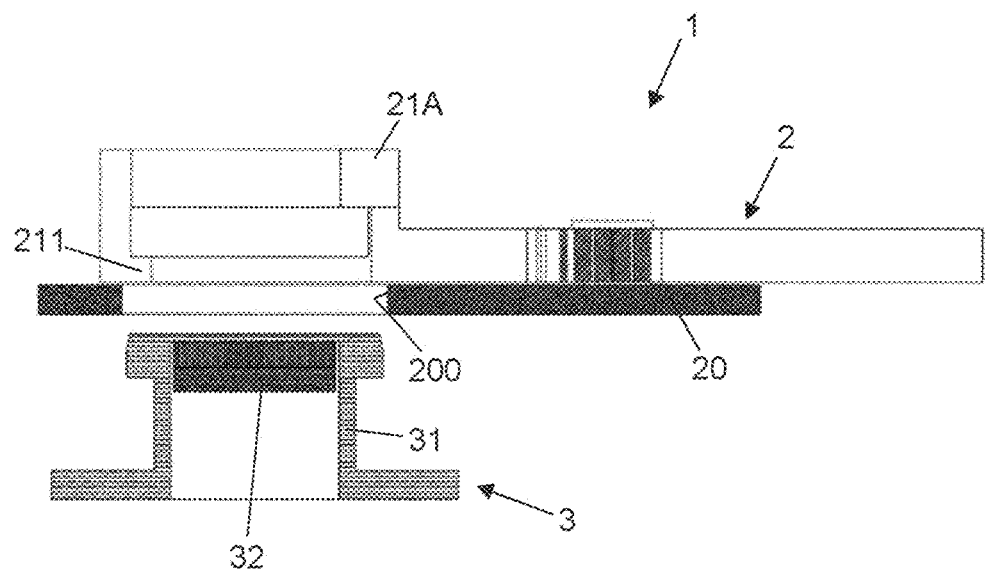
FIG. 9D shows a sectional view along line B-B of FIG. 9B.
Figure 10A:
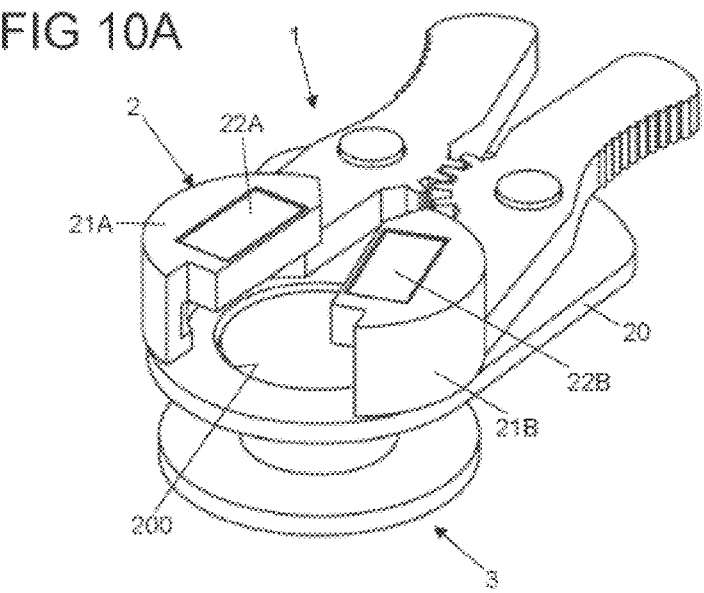
FIG. 10A shows a view of the closure device, on further closing.
Figure 10B:
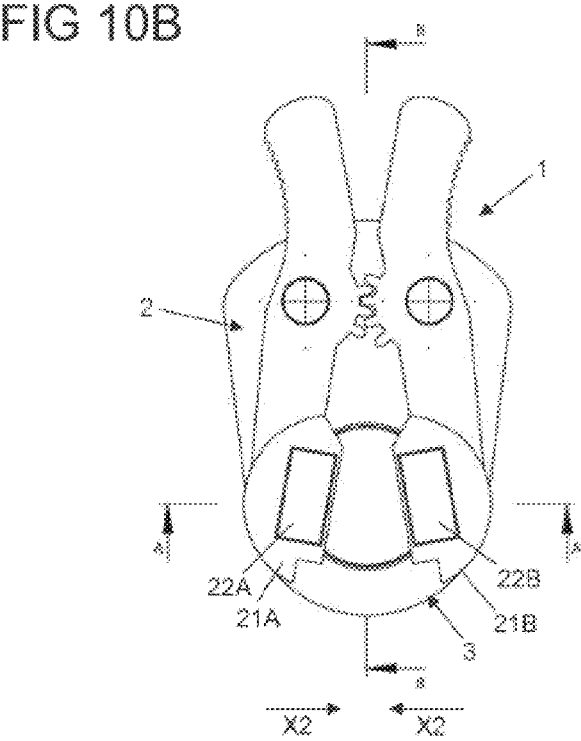
FIG. 10B shows a top view of the closure device.
Figure 10C:
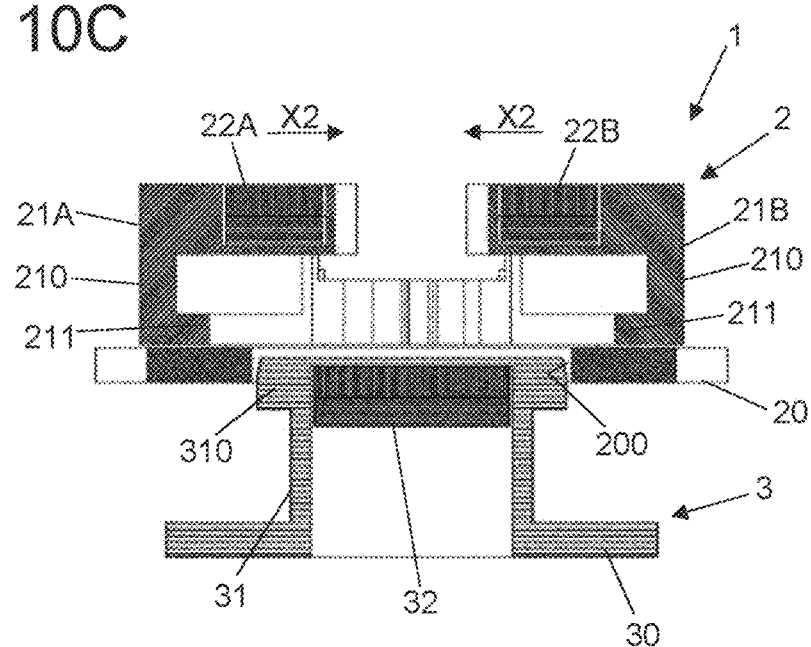
FIG. 10C shows a sectional view along line A-A of FIG. 10B.
Figure 10D:
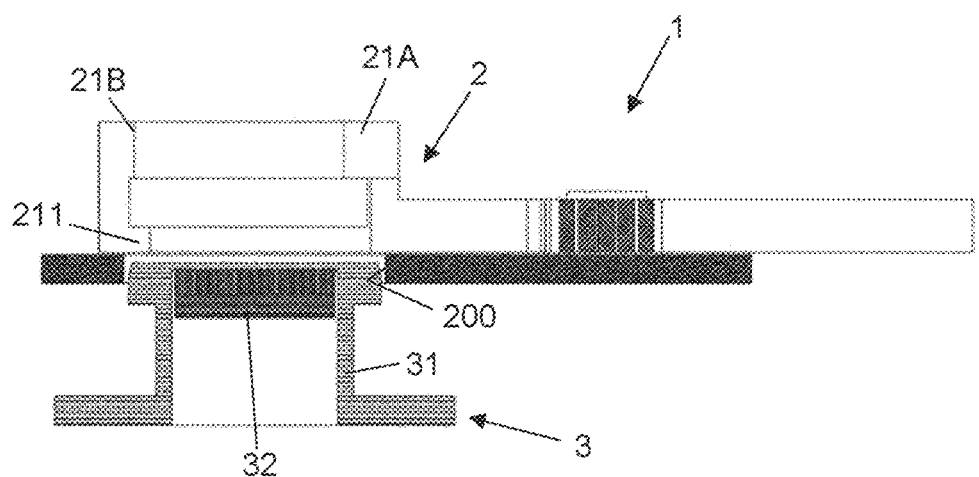
FIG. 10D shows a sectional view along line B-B of FIG. 10B.
Figure 11C:
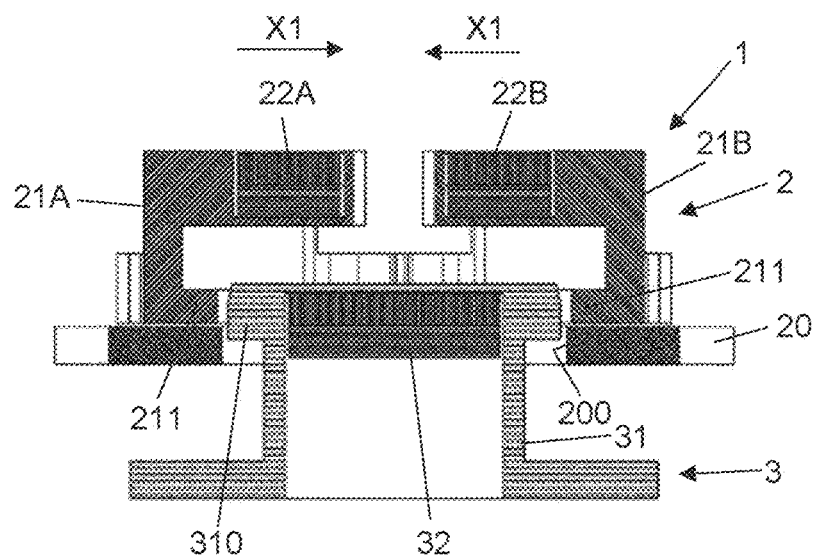
FIG. 11C shows a sectional view along line A-A of FIG. 11B.
Figure 11D:
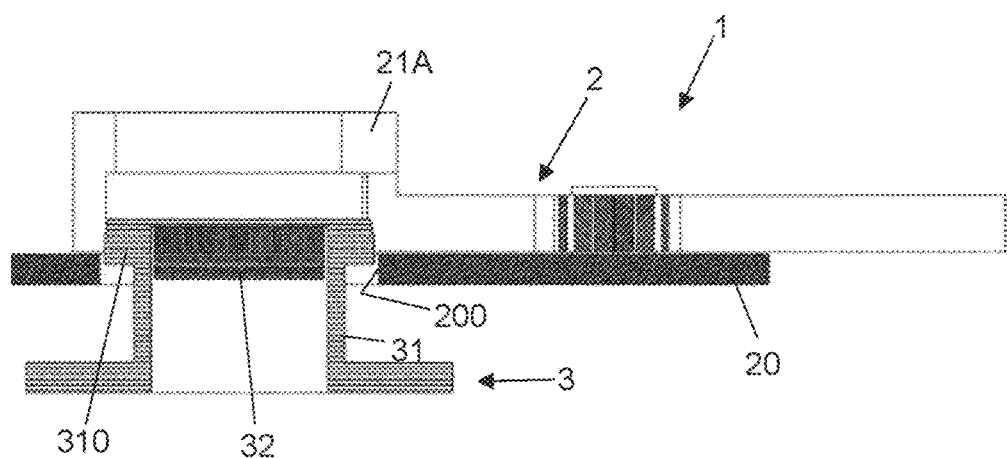
FIG. 11D shows a sectional view along line B-B of FIG. 11B.

As this can be taken in particular from the sectional view of FIG. 6D, the triggering portion 251 protrudes into a region inside the claw portions 210, into which the closure part 3 is introduced with the engagement element 31 on closing of the closure device 1. On closing, the closure part 3 thus cooperates with the triggering portion 251 and thereby shifts the locking element 25 radially to the outside so that the locking portion 150 is moved out of a position between the closure elements 21A, 21B, as this is shown at the transition from FIGS. 6A-6D (representing the open position) towards FIGS. 7A-7D (representing the closed position).

When the locking element 25 has been moved out of its intermediate position between the closure elements 21A, 21B, the closure elements 21A, 21B are drawn towards each other due to the magnetic interaction with the magnetic element 32 of the engagement element 31 and thus get into the locking position in which the closure parts 2, 3 are connected to each other.

The locking element 25 in particular can ensure that to produce the engagement with the engagement element 31, the closure elements 21A, 21B only are drawn towards each other when the engagement element 31 has been inserted into an opening 200 of the housing element 20 sufficiently far so that the locking between the closure elements 21A, 21B and the engagement portion 310 of the engagement element 31 can be produced safely and reliably. False locking can be counteracted in this way.

Otherwise, the exemplary embodiment of FIGS. 6A-6D and 7A-7D is functionally identical with the exemplary embodiment described above with reference to of FIGS. 1 to 5D, so that reference also is made to the preceding explanations.

In the exemplary embodiments described above, the closure device 1 can be opened again by a user acting on the closure elements 21A, 21B and for example pulling the same apart against the engagement direction X2. This can be effected manually or via a suitable actuating mechanism, for example in the form of a linkage, a lever transmission, an eccentric element or another mechanism.

It is also conceivable that for opening a polarity of the magnetic element 32 for example is reversed by mechanically rotating the magnetic element 32. The magnetic element 32 for example can be rotatable such that instead of the south pole S (see FIG. 2) a north pole N points towards the magnetic elements 22A, 22B of the closure elements 21A, 21B so that the magnetic attraction is reversed into a magnetic repulsion between the magnetic element 32 and the magnetic elements 22A, 22B. In this way, the closure elements 21A, 21B are magnetically opened, and the locking is eliminated.

Figure 12A:
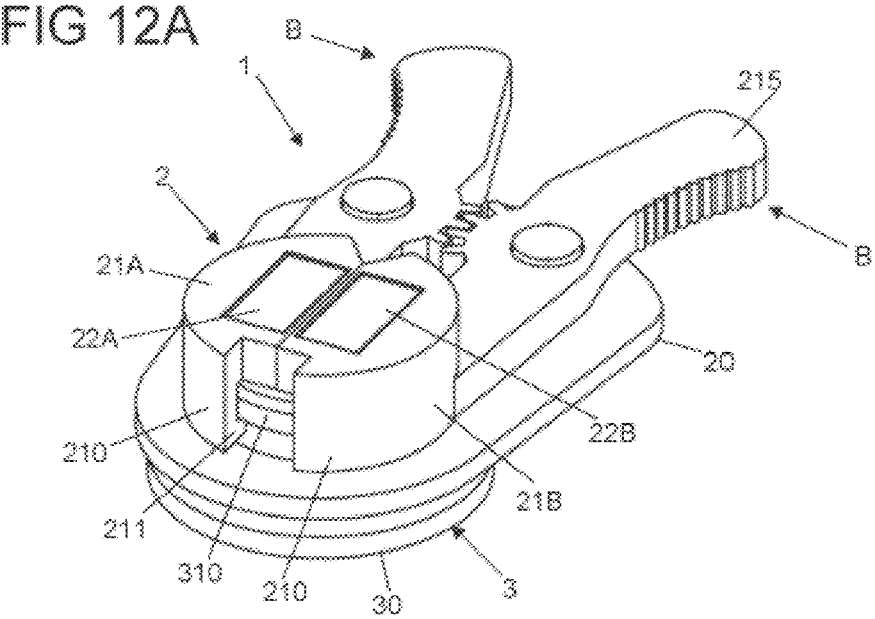
FIG. 12A shows a view of the closure device, in the closed position.
Figure 12B:
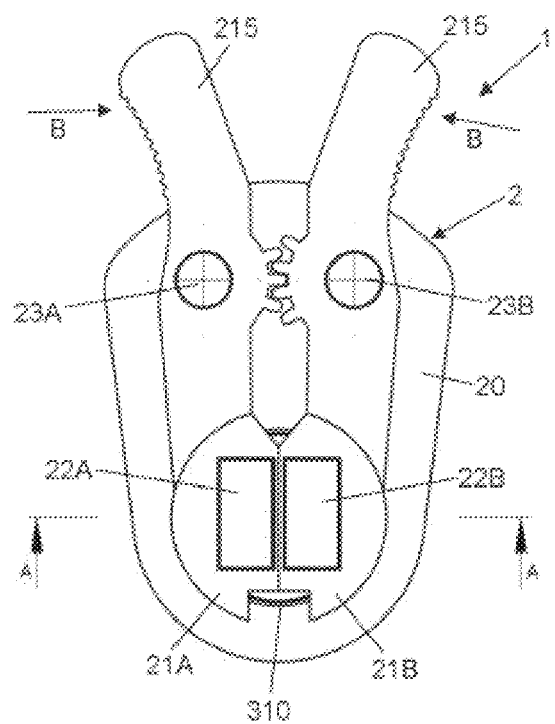
FIG. 12B shows a top view of the closure device.
Figure 12C:
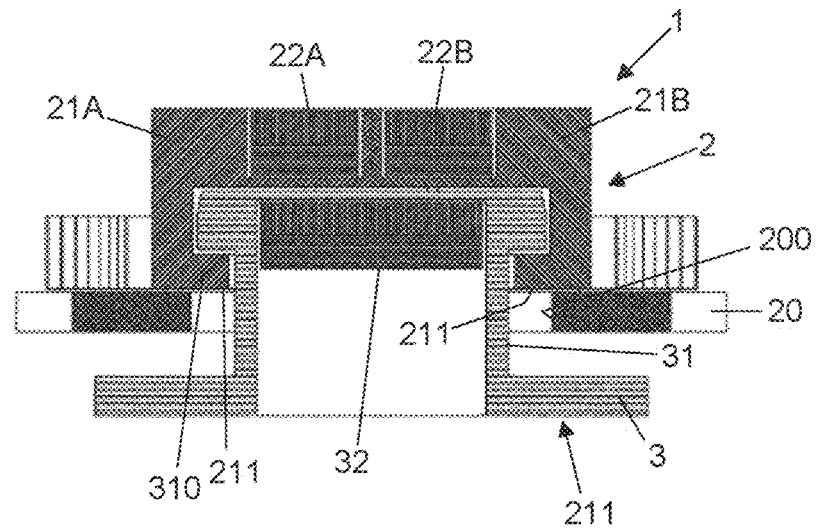
FIG. 12C shows a sectional view along line A-A of FIG. 12B.
Figure 12D:
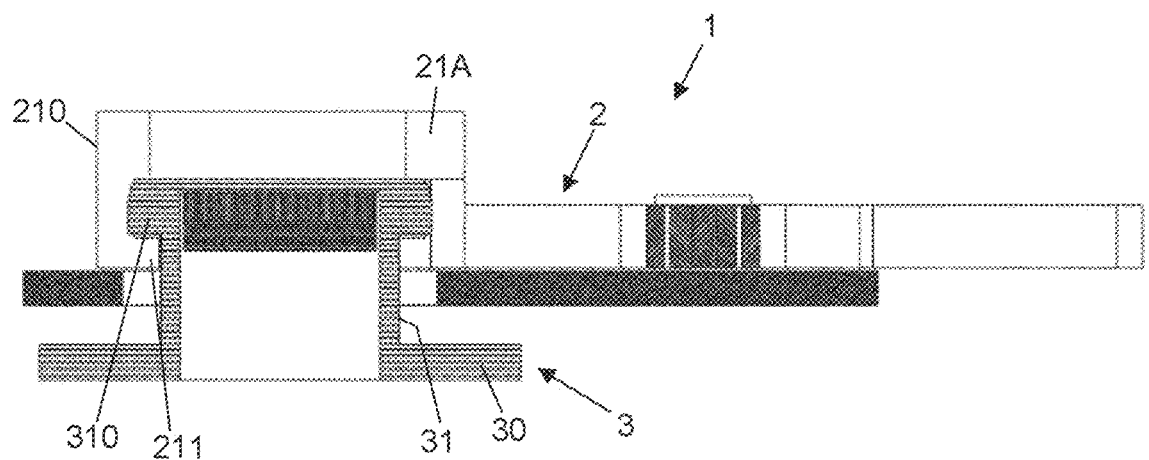
FIG. 12D shows a sectional view along line B-B of FIG. 12B.
Figure 17B:
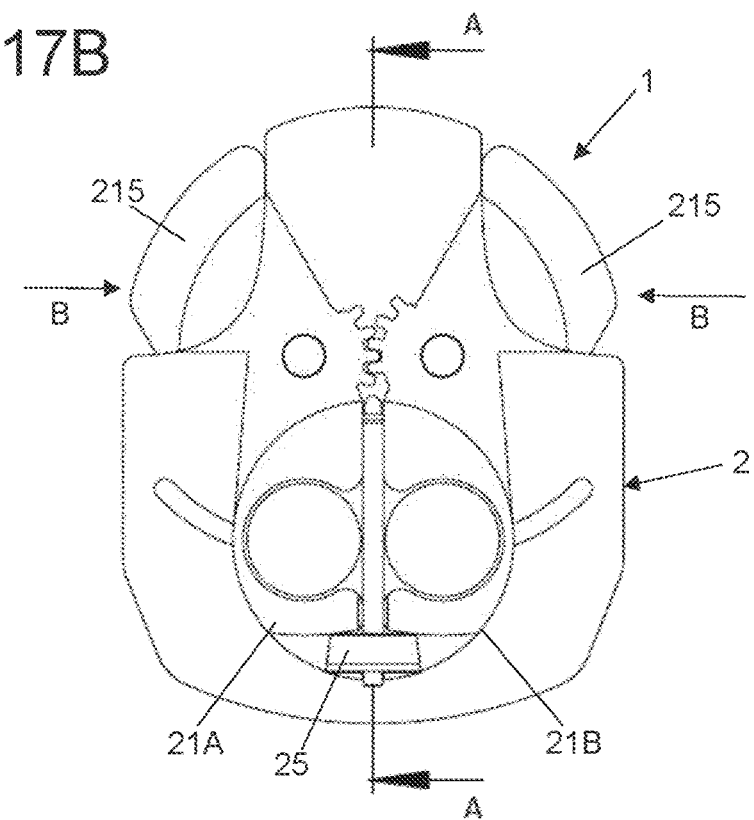
FIG. 17B shows a top view of the closure device.
Figure 17C:
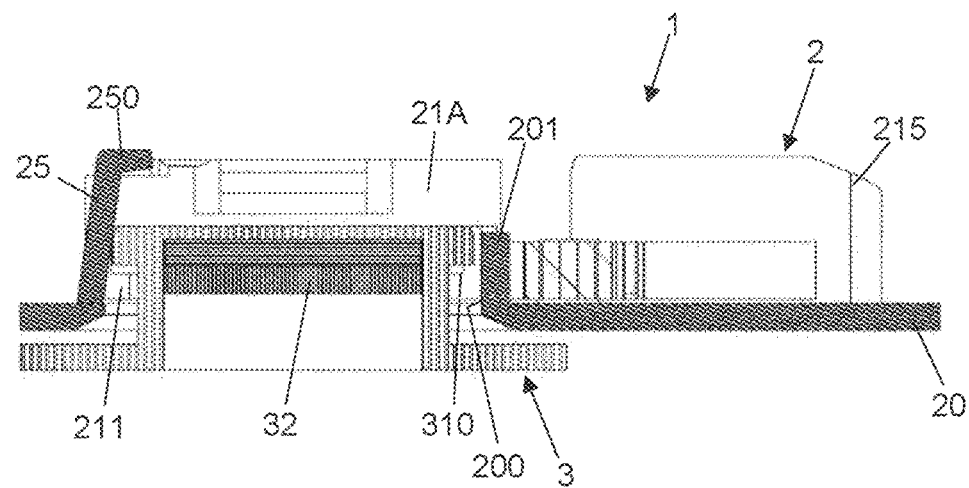
FIG. 17C shows a sectional view along line A-A of FIG. 17B.
Figure 18A:
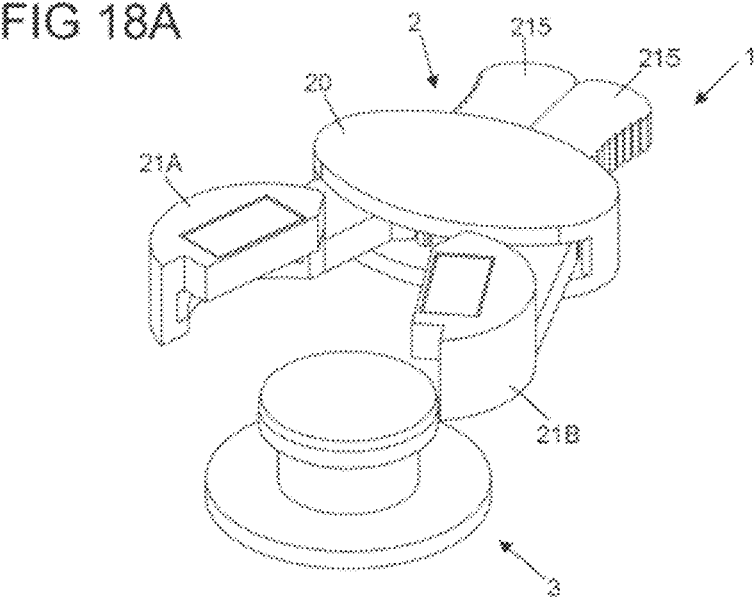
FIG. 18A shows a view in turn of another exemplary embodiment of a closure device, in an open position.
Figure 18B:
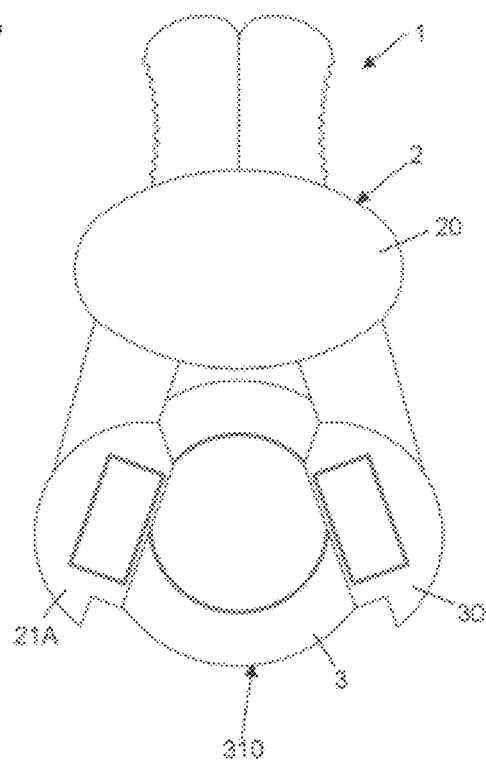
FIG. 18B shows a top view of the closure device.
Figure 19A:
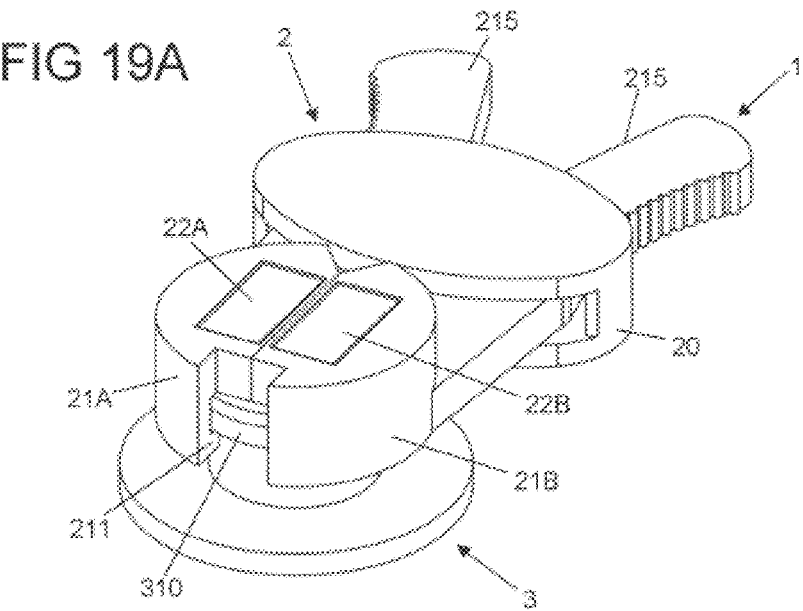
FIG. 19A shows a view of the closure device, in a closed position.
Figure 19B:
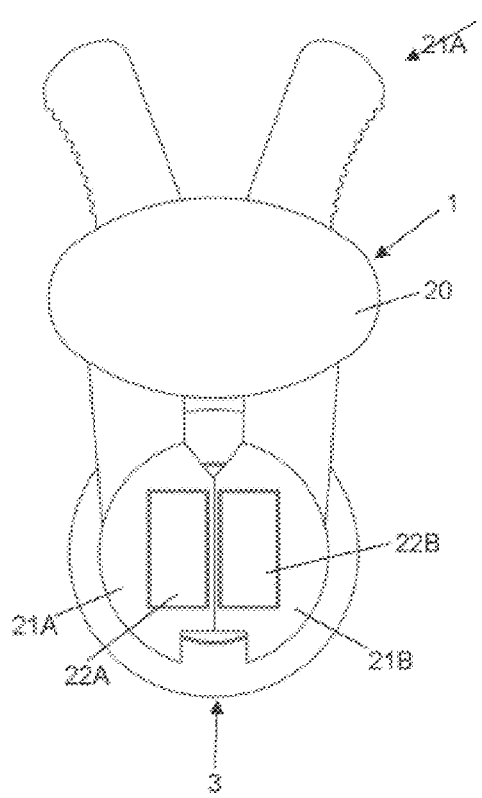
FIG. 19B shows a top view of the closure device.
Figure 20A:
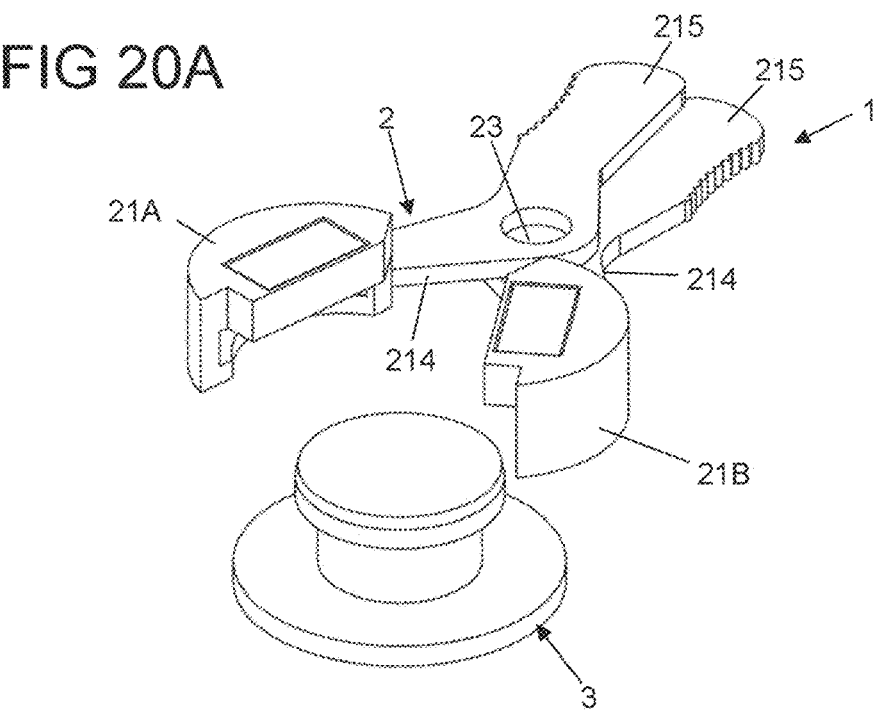
FIG. 20A shows a view of again another exemplary embodiment of a closure device, in an open position.
Figure 20B:
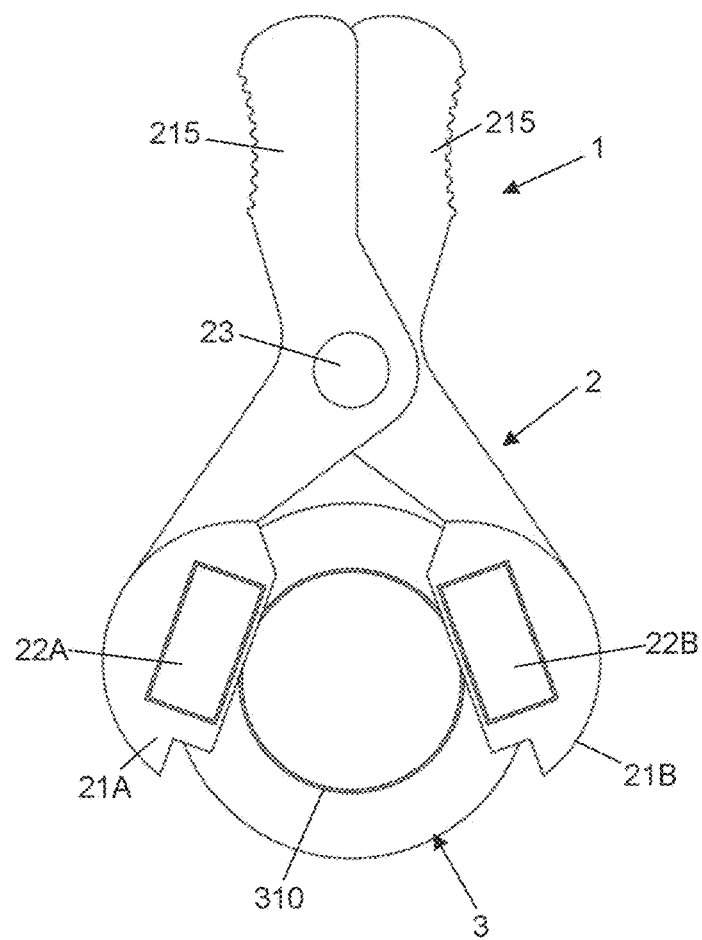
FIG. 20B shows a top view of the closure device.
Figure 21A:
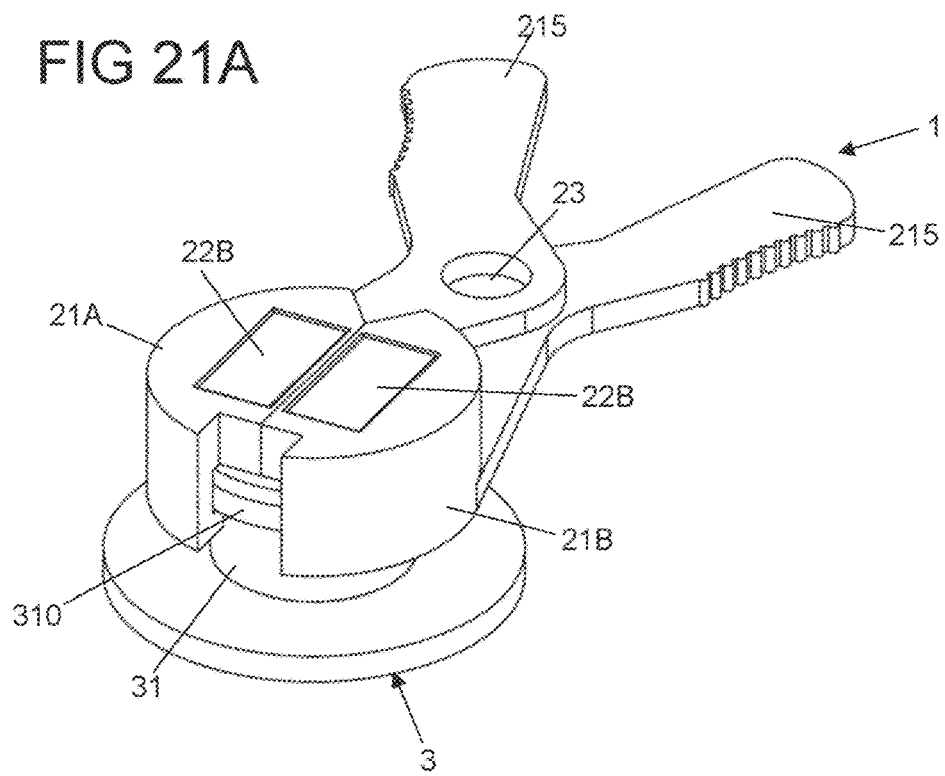
FIG. 21A shows a view of the closure device, in a closed position.
Figure 21B:
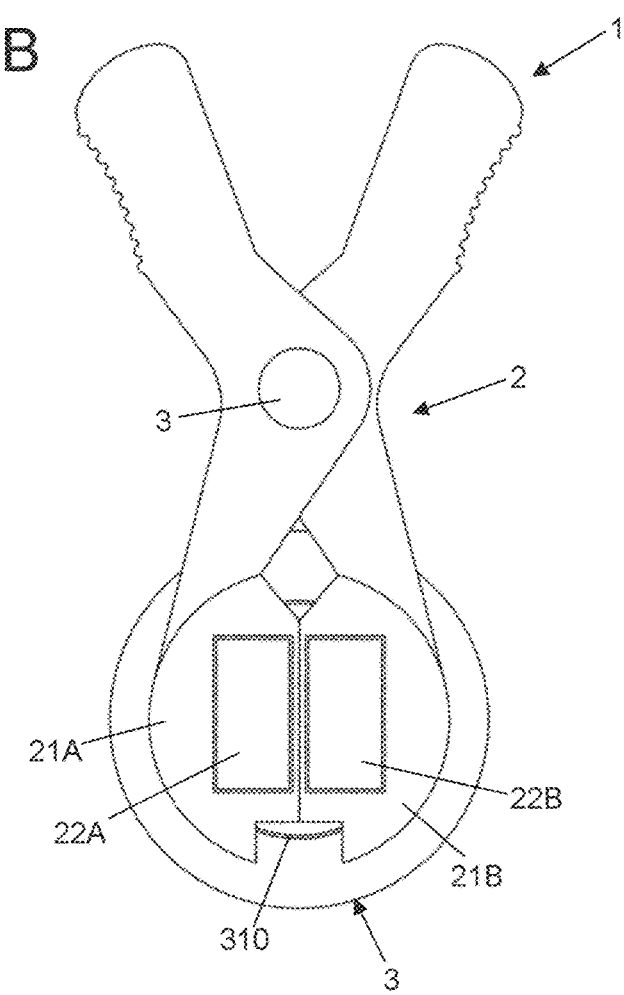
FIG. 21B shows a top view of the closure device.
Figure 22A:
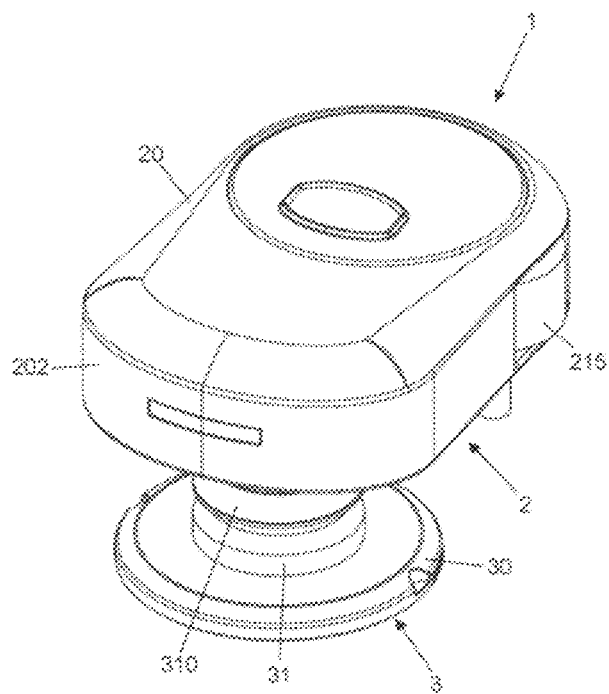
FIG. 22A shows a view of again another exemplary embodiment of a closure device, in an open position.
Figure 22B:
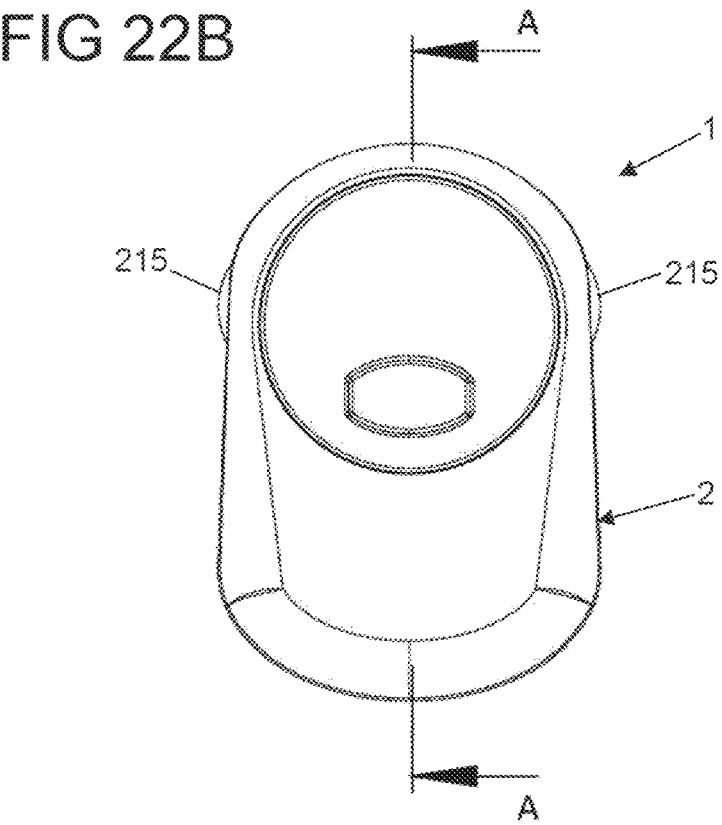
FIG. 22B shows a top view of the closure device.
Figure 22C:
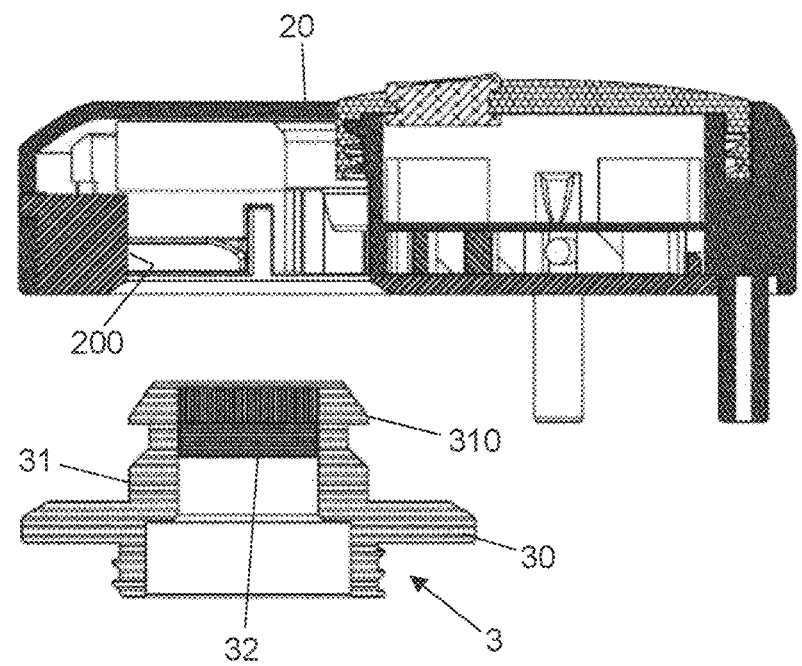
FIG. 22C shows a sectional view along line A-A of FIG. 22B.
Figure 22D:
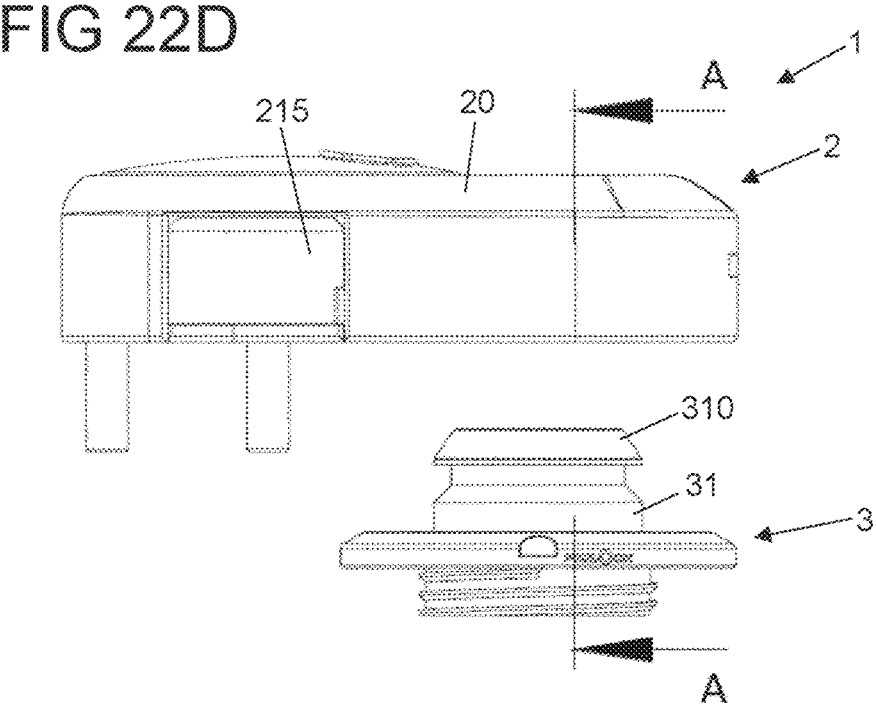
FIG. 22D shows a side view of the closure device.
Figure 22E:
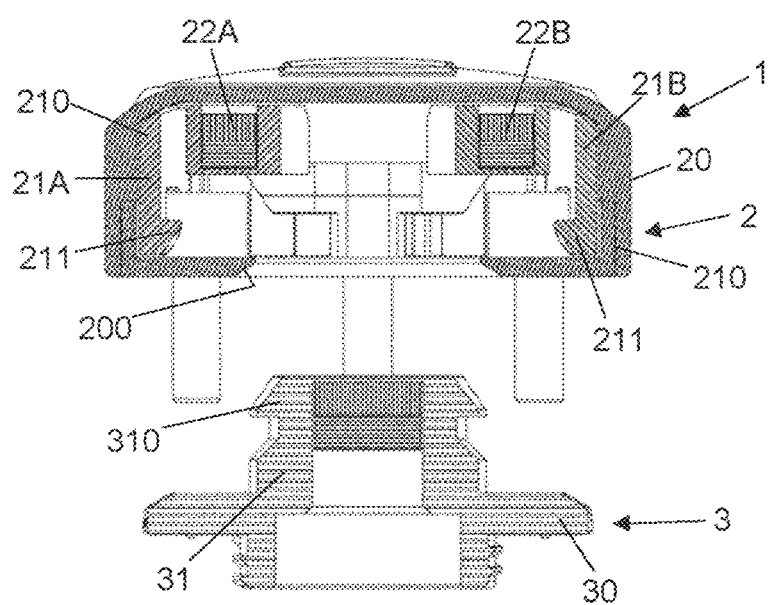
FIG. 22E shows a sectional view along line A-A of FIG. 22D.
Figure 23A:
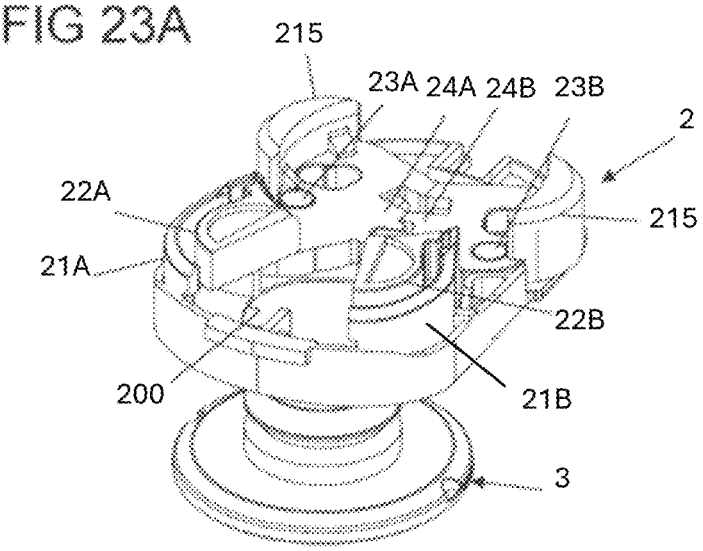
FIG. 23A shows a view of the closure device, in which a housing part at the first closure part is removed.
Figure 23B:
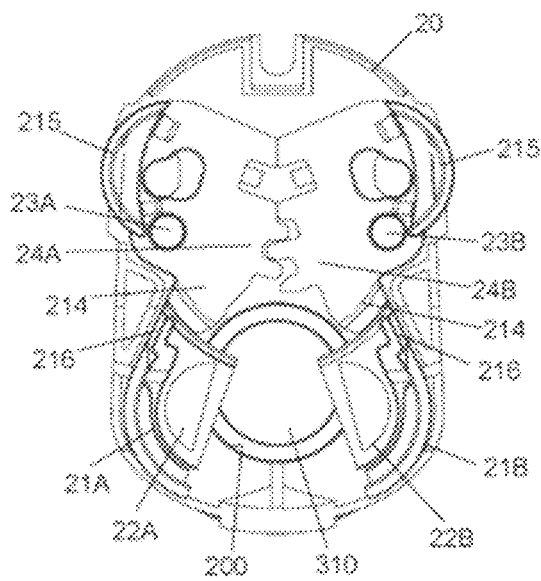
FIG. 23B shows a top view of the arrangement of FIG. 23A.
Figure 24A:
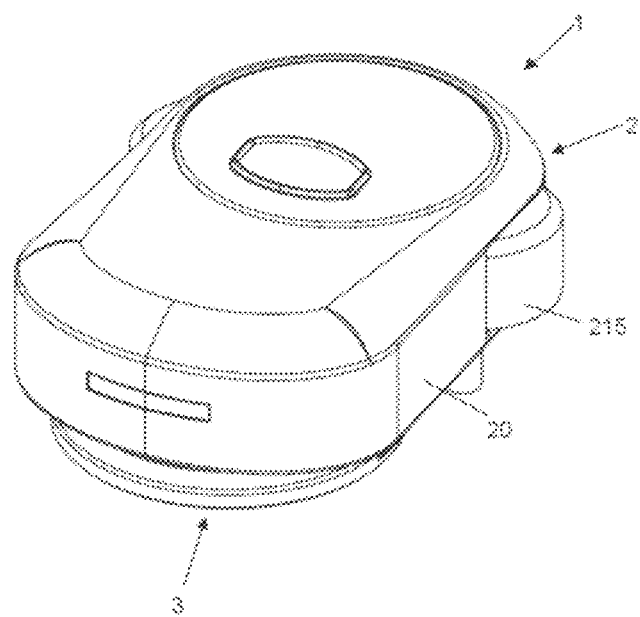
FIG. 24A shows a view of the closure device, in a closed position.
Figure 24B:
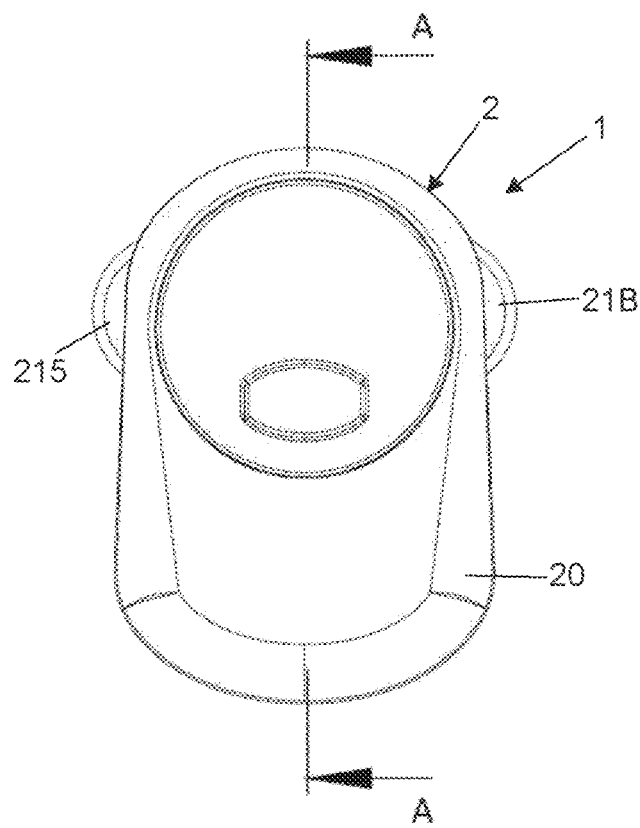
FIG. 24B shows a top view of the closure device.
Figure 24C:
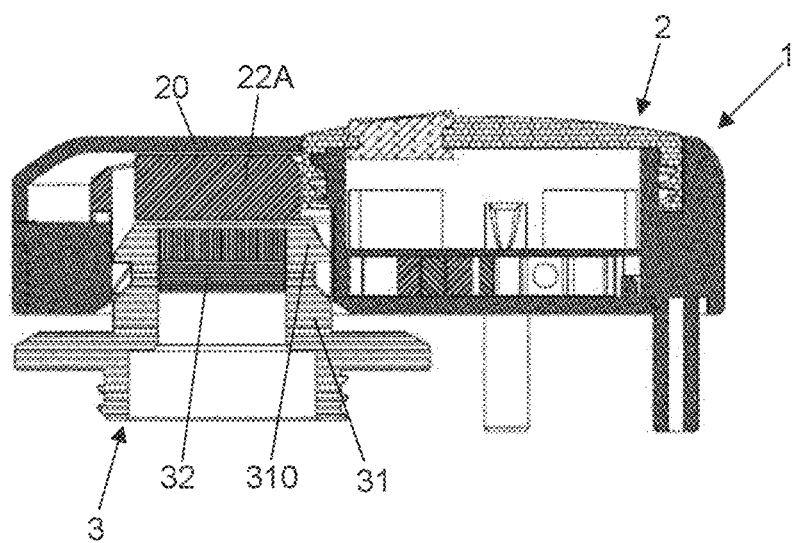
FIG. 24C shows a sectional view along line A-A of FIG. 24B.
Figure 24D:
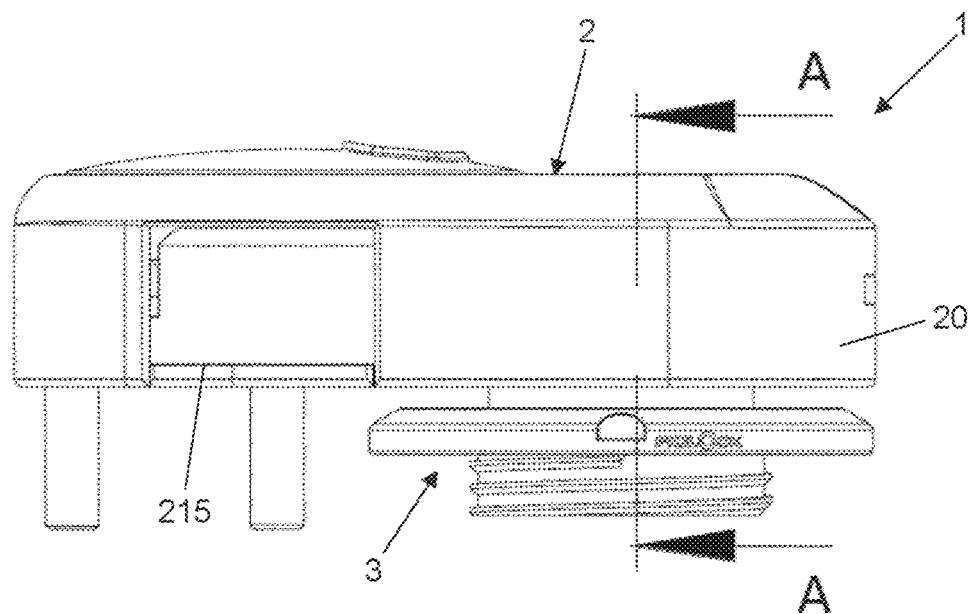
FIG. 24D shows a side view of the closure device.
Figure 24E:
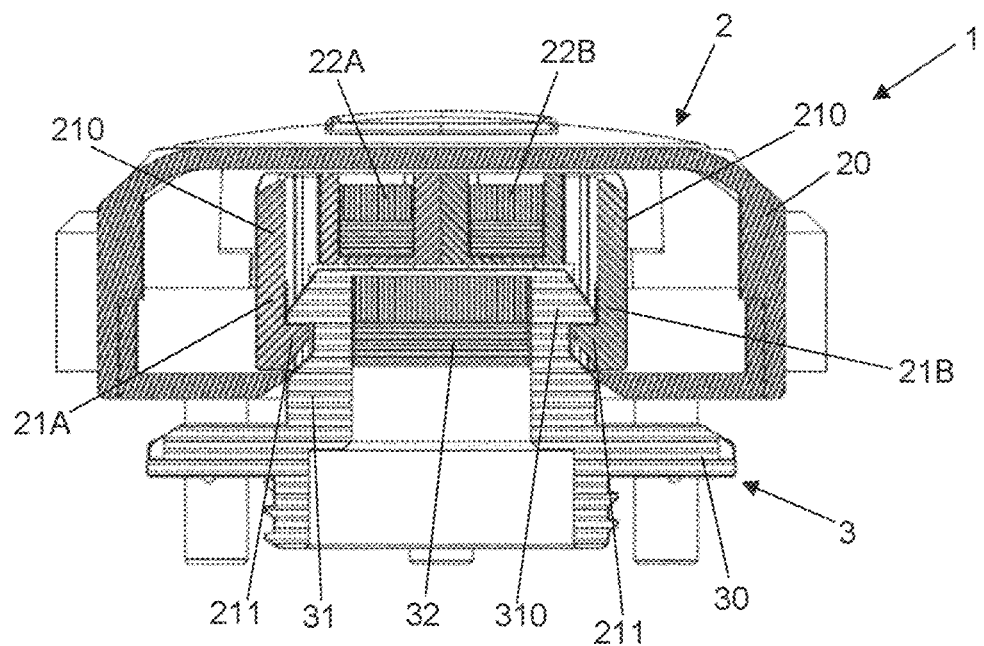
FIG. 24E shows a sectional view along line A-A of FIG. 24D.
Figure 25A:
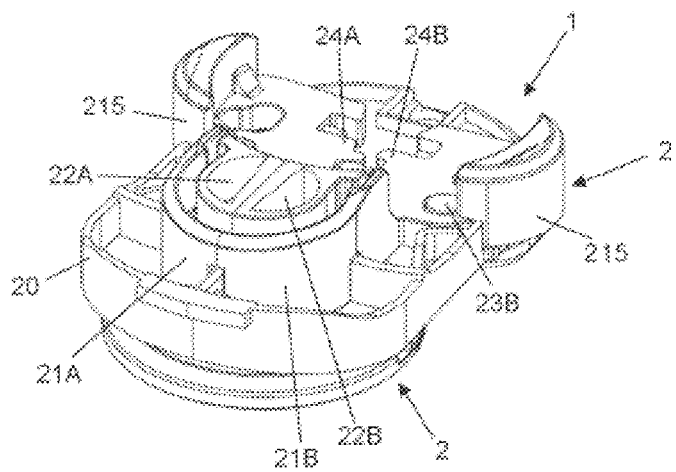
FIG. 25A shows a view of the closure device, in which a housing part at the first closure part is removed.
Figure 25B:
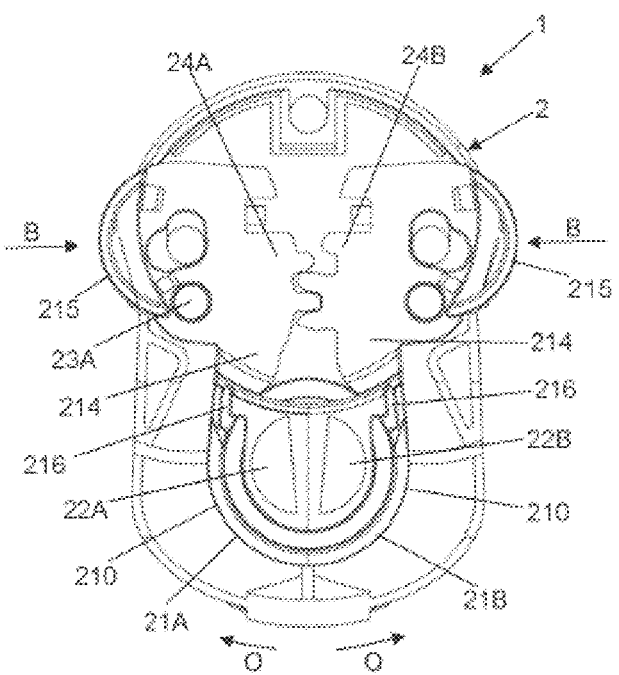
FIG. 25B shows a top view of the arrangement of FIG. 25A.

In an exemplary embodiment shown in FIGS. 8A-8D to FIG. 13, the closure elements 21A, 21B each include an actuating portion 215 in the form of a lever portion that is formed at a lever end of the respective closure element 21A, 21B facing away from the respective claw portion 210 and can be manually actuated by a user. By acting on the actuating portions 215 in an actuating direction B (see for example FIGS. 12A and 12B) a user can shift the closure elements 21A, 21B relative to the housing element 20 and to each other such that the claw portions 210 of the closure elements 21A, 21B are moved away from each other and the engagement element 31 thus is released from the closed position, so that the closure parts 2, 3 can be separated from each other. By acting on the actuating portions 215, the closure device 1 can thus be opened and be transferred from the closed position (FIGS. 12A-12D) into the open position (FIGS. 8A-8D).

Otherwise, the exemplary embodiment of FIGS. 8A to 13 is functionally identical with the exemplary embodiment described above, so that reference also is made to the preceding explanations.

In an exemplary embodiment shown in FIGS. 14A, 14B and 15A, 15B a pretensioning element 26 in the form of a mechanical spring additionally is arranged between the closure elements 21A, 21B, which serves to produce a mechanical pretension between the closure elements 21A, 21B in the engagement direction X2.

The pretensioning element 26 acts between the actuating portions 215 and is formed as a compression spring. The pretensioning force produced by the pretensioning element 26 linearly rises (at least approximately) with increasing distance of the claw portions 210 from each other against the engagement direction X2.

In cooperation with the magnetic repulsion between the magnetic elements 22A, 22B, the pretensioning element 26 serves to set a defined open position of the closure elements 21A, 21B. In the open position, the closure elements 21A, 21B take a position relative to each other in which the magnetic repulsion between the magnetic elements 22A, 22B and the (oppositely directed) pretensioning force of the pretensioning element 26 are in equilibrium so that the repelling force of the magnetic elements 22A, 22B against the engagement direction X2 and the pretensioning force of the pretensioning element 26 in the engagement direction X2 just balance out.

Such a pretensioning element 26 can also be advantageous in particular when a locking element 25 is used, as in the exemplary embodiment of FIGS. 6A-6D and 7A-7D. For opening, the closure elements 21A, 21B can be moved away from each other with their claw portions 210 to such an extent that the locking element 25 gets into the locking position of FIGS. 6A-6D due to its inherent elasticity. Due to the pretensioning force of the pretensioning element 26, the closure elements 21A, 21B then get into a position in contact with the locking element 25 so that when the closure parts 2, 3 are attached again, the closure device 1 can again be closed in a reliable way.

When such a locking element 25 is provided, the magnetic elements 22A, 22B possibly can also be designed such that there is no magnetic repulsion between the closure elements 21A, 21B. For example, the magnetic elements 22A, 22B can each be formed by a (passive) magnetic armature so that the magnetic elements 22A, 22B cooperate with the magnetic element 32 of the closure part 3 in a magnetically attracting way, but do not magnetically interact with each other, in particular not in a repelling way. In this case, keeping open the closure elements 21A, 21B is effected by the locking element 25, which prevents the closure elements 21A, 21B from being moved towards each other in the open position of the closure device 1.

Otherwise, the exemplary embodiment of FIGS. 14A, 14B and 15A, 15B corresponds to the exemplary embodiment of FIGS. 8A to 13.

In an exemplary embodiment shown in FIGS. 16A-16C and 17A-17C, a locking element 25 acts between the closure elements 21A, 21B in the open position (FIGS. 16A-16C) in order to keep the closure elements 21A, 21B in their open position. Analogously to what has been described above with reference to FIGS. 6A to 7D, the locking element 25 is unlocked on closing of the closure device 1 so that in the closed position (FIGS. 17A-17C) the closure elements 21A, 21B again are in locking engagement with the engagement element 31 of the closure part 3.

Via a guide portion 201 at an edge portion of the opening 200 in the housing element 20 of the closure part 2, which faces away from the locking element 25, a guidance is provided for the engagement element 31 on attachment of the closure parts 2, 3 to each other so that the engagement element 31 with the engagement portion 310 interacts with the locking element 25 in a defined way.

In the illustrated exemplary embodiment, actuating portions 215 at the closure elements 21A, 21B are formed by rounded button elements, which can be pressed towards each other along the actuating direction B.

In an exemplary embodiment shown in FIGS. 18A, 18B and 19A, 19B the housing element 20 is configured as an enclosing housing that encloses the closure elements 21A, 21B in the region of the axle elements 23A, 23B. Otherwise, the exemplary embodiment is functionally identical with the exemplary embodiment of FIGS. 8A to 13, so that reference also is made to the preceding explanations.

In an exemplary embodiment shown in FIGS. 20A, 20B and 21A, 21B the closure elements 21A, 21B are pivotally mounted on a common axle element 23 and thus are pivotally arranged on each other. An additional base element in the form of a housing element can be omitted in this case.

Apart from this, the exemplary embodiment is functionally identical with the exemplary embodiment described above.

In an exemplary embodiment shown in FIGS. 22A-22E to FIGS. 25A, 25B the closure part 2 includes a housing element 20 in the form of a housing that is composed of housing parts 202, 203 and in its interior pivotally mounts the closure elements 21A, 21B so as to be pivotable about axle elements 23A, 23B formed on the housing part 203. Actuating portions 215 here are laterally accessible at the housing and can be actuated by a user, in particular in order to transfer the closure elements 21A, 21C from the closed position (FIGS. 24A-24E, 25A, 25B) into the open position (FIGS. 22A-22E, 23A, 23B).

In the illustrated exemplary embodiment, the closure elements 21A, 21B are formed with claw portions 210, which are connected to the shank portion 214 of the associated closure element 21A, 21B via one connecting portion 216 each. In the region of the connecting portion 216 the closure element 21A, 21B is elastic so that the claw portion 210 can elastically be deflected relative to the shank portion 214 and in particular to the magnetic element 22A, 22B rigidly connected to the shank portion 214. Thus, an elasticity exists between the claw portions 210 and the magnetic elements 22A, 22B, which can be advantageous in order to produce a backlash-free connection between the closure elements 21A, 21B and the engagement element 31 of the closure part 3, as this can be taken for example from the sectional view of FIGS. 24C and 24E.

Otherwise, the illustrated exemplary embodiment is functionally identical with the exemplary embodiment of FIGS. 8A to 13, so that reference also is made to the preceding explanations.

Figure 26A:
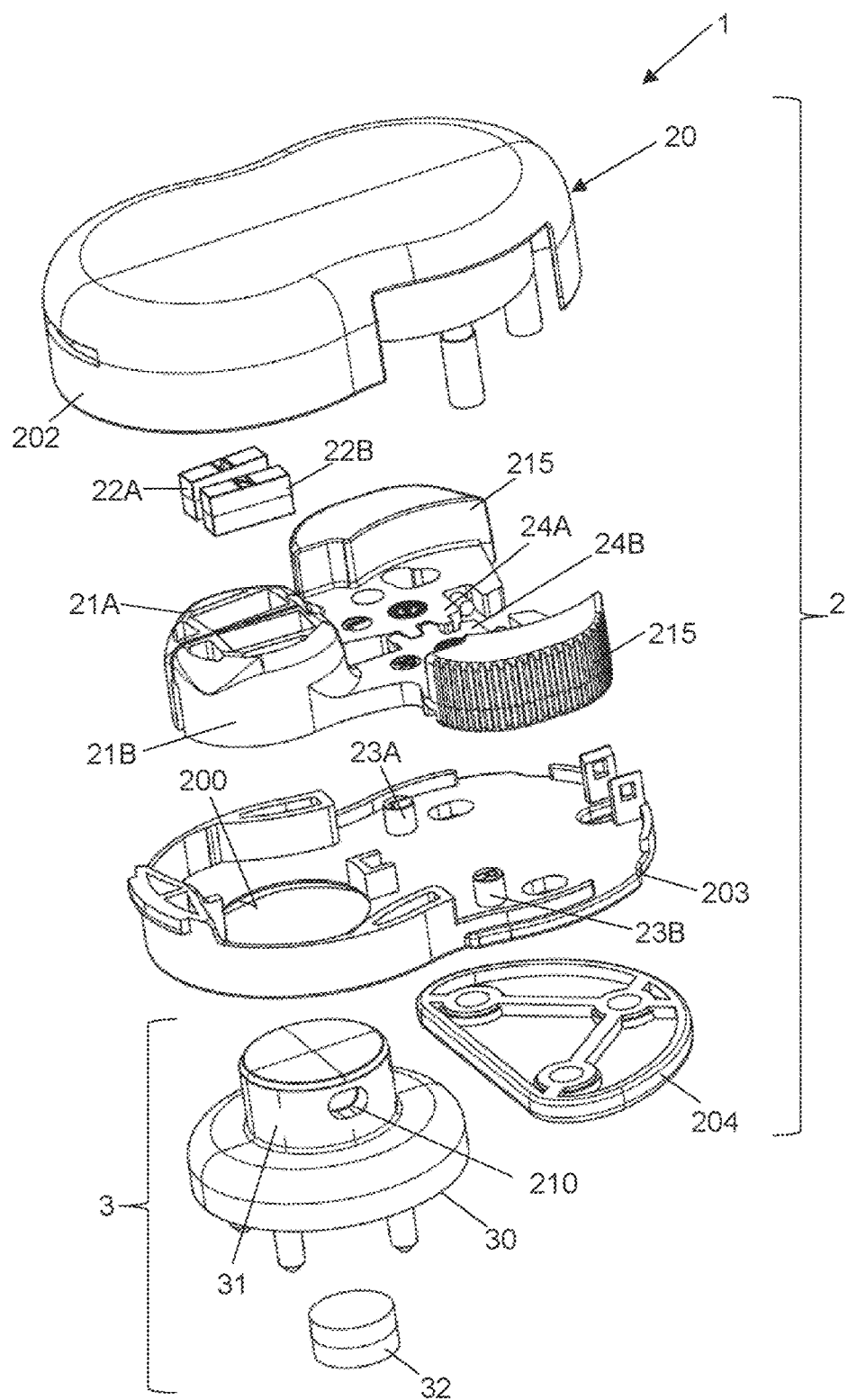
FIG. 26A shows an exploded view of another exemplary embodiment of a closure device.
Figure 26B:
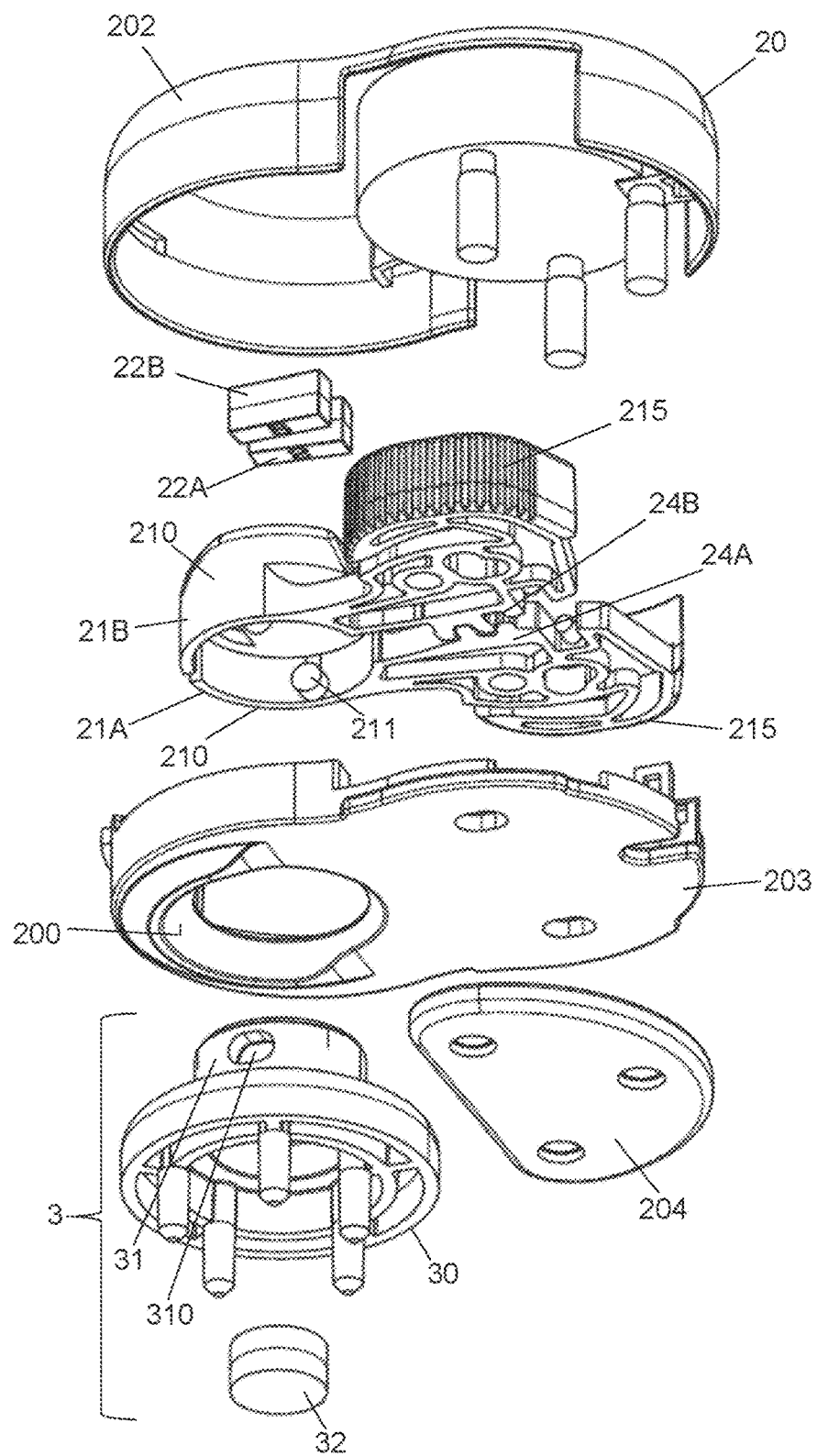
FIG. 26B shows another exploded view of the closure device.

In an exemplary embodiment shown in FIGS. 26A, 26B, form-fitting portions 211 in the form of one pin each are formed on the closure elements 21A, 21B, which pin serves for engagement into an associated engagement portion 310 in the form of an engagement opening at the engagement element 31 of the closure part 3. In a modification of the exemplary embodiments described above, the form-fitting portions 211 of the closure elements 21A, 21B thus are not formed by circular arc-shaped latching protrusions, but by inwardly protruding pins, which in the closed position are in engagement with the engagement portions 310 in the form of the engagement openings on both sides of the engagement element 31 of the closure part 3.

In the exemplary embodiment of FIGS. 26A, 26B the closure elements 21A, 21B are enclosed in a housing element 20 in the form of a housing formed by housing parts 202, 203, 204 and pivotally mounted therein. Analogously to the exemplary embodiment of FIGS. 22A to 25B, actuating portions 215 are accessible from outside and can be actuated for pivoting the closure elements 21A, 21B, in particular for opening the closure device 1.

In functional terms, the exemplary embodiment of FIGS. 26A, 26B otherwise is identical with the exemplary embodiment of FIGS. 8A to 13, so that reference is made to the preceding explanations.

The closure devices 1 described above can be used for connecting two assemblies to each other, for example as a closure for bags, for items of clothing, for shoes, for helmets, for safety equipment or for other assemblies that are to be loadably fixed relative to each other.

The closure device 1 can, however, also be used for producing an electrical connection. For this purpose, electrical contact elements can be arranged on the closure parts 2, 3, which on closing of the closure device 1 get in contact with each other in an electrically contacting way so that an electrical connection between one or more electric lines is produced via the closure parts 2, 3.

For example, such contacts can be arranged on the closure elements 21A, 21B and the engagement element 31. In the exemplary embodiments described above, electrical contact elements 27 can be arranged on the claw portion 210 of one or of both closure elements 21A, 21B, which are connected with electric leads 270 and in the closed position of the closure device 1 are in electric contact with contact elements 33 at the engagement element 31 of the closure part 3, as this is schematically shown in FIG. 27.

The contact elements 27 for example can extend in the form of a circular arc on the inside of the edge portion 212 of the respective form-fitting portion 211. The contact elements 33 at the engagement element 31 on the other hand can be circumferentially closed for example as contact rings at the engagement element 31. Leads 270, 330 can be embedded in the respective engagement element or can also be mounted on a surface.

Other arrangements of contact elements also are conceivable and possible.

For example, it is conceivable that the closure elements 21A, 21B and also the engagement element 31 are electrically conductive and thus an electric contacting is produced directly via the closure elements 21A, 21B and the engagement element 31.

The idea underlying the solution is not limited to the exemplary embodiments described above, but can also be realized in an entirely different way.

Although in the exemplary embodiments described above two closure elements each are provided, this is not limiting. In principle, there can also be provided only one single closure element that is designed to produce a locking connection with an associated engagement element.

The at least one closure element can be pivotally mounted on an associated base element, for example in the form of a housing element. However, this is not limiting either. The closure element for example can also be shiftable linearly or along a curved path or be otherwise movable relative to the associated base element.

LIST OF REFERENCE NUMERALS 1 closure device
2 closure part
20 housing element
200 opening
201 guide portion
202-204 housing part
21A, 21B closure element
210 claw portion
211 form-fitting portion
212 edge portion
213 wall portion
214 shank portion
215 actuating portion
216 connecting portion
22A, 22B magnetic element
23, 23A, 23B axle element
24A, 24B coupling device
25 locking element
250 locking portion
251 triggering portion
26 pretensioning element
27 electrical contact element
270 lead
3 closure part
30 base body
31 engagement element
310 engagement portion
32 magnetic element
33 electrical contact element
330 lead
B actuating direction
D1, D2 pivot axis
N, S magnetic pole
O opening direction
X1 closing direction
X2 engagement direction

The invention claimed is:

1. A closure device, comprising
a first closure part, which includes a base element and at least one closure element movable relative to the base element with a form-fitting portion arranged thereon, and
a second closure part, which includes an engagement element with an engagement portion formed thereon,
wherein in an open position of the closure device the first closure part and the second closure part are separated from each other and can be attached to each other along a closing direction for closing the closure device, and
wherein the form-fitting portion of the at least one closure element can be brought into engagement with the engagement portion of the engagement element in an engagement direction substantially transversely to the closing direction, so that in a closed position the first closure part and the second closure part are held at each other along the closing direction,
further comprising a first magnetic element arranged on the at least one closure element of the first closure part and a second magnetic element arranged on the engagement element of the second closure part, wherein in the open position the at least one closure element of the first closure part takes a first position relative to the base element, and on closing the first magnetic element and the second magnetic element cooperate in a magnetically attracting way so that the at least one closure element is moved with the form-fitting portion in the engagement direction out of the first position relative to the base element in order to bring the form-fitting portion into engagement with the engagement portion of the engagement element, wherein the first closure part includes a locking element which in the open position acts on the at least one closure element with a locking portion in order to hold the at least one closure element in the first position.

2. The closure device according to claim 1, wherein a force is applied onto the at least one closure element of the first closure part in the open position such that the at least one closure element takes the first position relative to the base element.

3. The closure device according to claim 1, wherein in the open position a force is applied onto the at least one closure element of the first closure part by magnetic action of the first magnetic element.

4. The closure device according to claim 1, wherein the locking element includes a triggering portion which is configured to cooperate with the second closure part on closing, in order to shift the locking element for releasing the at least one closure element.

5. The closure device according to claim 1, wherein the at least one closure element can be moved relative to the base element against the engagement direction in order to eliminate the operative connection with the engagement portion.

6. The closure device according to claim 1, wherein the at least one closure element includes a claw portion that forms a form-fitting portion for positively engaging behind the engagement portion.

7. The closure device according to claim 6, wherein at least one of
the form-fitting portion extends along a circular arc around the closing direction and
the form-fitting portion is elastically connected to the associated, first magnetic element.

8. The closure device according to claim 1, wherein the base element is realized by a housing element.

9. The closure device according to claim 1, wherein the first closure part includes two closure elements and two first magnetic elements each arranged on one of the closure elements.

10. The closure device according to claim 9, wherein the closure elements are forcibly coupled to each other via a coupling device for joint movement.

11. The closure device according to claim 10, wherein the closure elements are forcibly coupled to each other mechanically.

12. The closure device according to claim 10, wherein the closure elements each include a coupling device in the form of a toothing for forced coupling.

13. The closure device according to claim 9, wherein in the open position a force is applied onto the closure elements due to the repelling effect of the first magnetic elements relative to each other and on closing said closure elements are drawn towards each other due to magnetic interaction with the second magnetic element.

14. The closure device according to claim 1, wherein the first closure part includes a pretensioning element which is configured to load the at least one closure element in the engagement direction.

15. A closure device, comprising
a first closure part, which includes a base element and at least one closure element movable relative to the base element with a form-fitting portion arranged thereon, and
a second closure part, which includes an engagement element with an engagement portion formed thereon,
wherein in an open position of the closure device the first closure part and the second closure part are separated from each other and can be attached to each other along a closing direction for closing the closure device, and
wherein the form-fitting portion of the at least one closure element can be brought into engagement with the engagement portion of the engagement element in an engagement direction substantially transversely to the closing direction, so that in a closed position the first closure part and the second closure part are held at each other along the closing direction,
further comprising a first magnetic element arranged on the at least one closure element of the first closure part and a second magnetic element arranged on the engagement element of the second closure part, wherein in the open position the at least one closure element of the first closure part takes a first position relative to the base element, and on closing the first magnetic element and the second magnetic element cooperate in a magnetically attracting way so that the at least one closure element is moved with the form-fitting portion in the engagement direction out of the first position relative to the base element in order to bring the form-fitting portion into engagement with the engagement portion of the engagement element,
wherein the first closure part includes at least one first electrical contact and the second closure part includes at least one second electrical contact, wherein in the closed position the at least one first electrical contact and the at least one second electrical contact are electrically contacted with each other.

16. A closure device, comprising
a first closure part, which includes a base element and at least one closure element movable relative to the base element with a form-fitting portion arranged thereon, and
a second closure part, which includes an engagement element with an engagement portion formed thereon,
wherein in an open position of the closure device the first closure part and the second closure part are separated from each other and can be attached to each other along a closing direction for closing the closure device, and
wherein the form-fitting portion of the at least one closure element can be brought into engagement with the engagement portion of the engagement element in an engagement direction substantially transversely to the closing direction, so that in a closed position the first closure part and the second closure part are held at each other along the closing direction,
further comprising a first magnetic element arranged on the at least one closure element of the first closure part and a second magnetic element arranged on the engagement element of the second closure part, wherein in the open position the at least one closure element of the first closure part takes a first position relative to the base element, and on closing the first magnetic element and the second magnetic element cooperate in a magnetically attracting way so that the at least one closure element is moved with the form-fitting portion in the engagement direction out of the first position relative to the base element in order to bring the form-fitting portion into engagement with the engagement portion of the engagement element,
wherein the at least one closure element can be pivoted relative to the base element about a pivot axis.

17. The closure device according to claim 16, wherein the pivot axis extends along the closing direction, perpendicularly to the closing direction or at an oblique angle to the closing direction.

18. The closure device according claim 16, wherein the at least one closure element is mounted on the base element so as to be pivoted about an axle element.

\* \* \* \* \*